US010613331B2

(12) United States Patent
Moore et al.

(10) Patent No.: US 10,613,331 B2
(45) Date of Patent: Apr. 7, 2020

(54) SYSTEMS, DEVICES, AND METHODS FOR SPLITTER OPTICS IN WEARABLE HEADS-UP DISPLAYS

(71) Applicant: NORTH INC., Kitchener (CA)

(72) Inventors: Joshua Moore, Elora (CA); Lloyd Frederick Holland, Kitchener (CA)

(73) Assignee: North Inc., Kitchener, Ontario (CA)

( * ) Notice: Subject to any disclaimer, the term of this patent is extended or adjusted under 35 U.S.C. 154(b) by 129 days.

(21) Appl. No.: 15/845,823

(22) Filed: Dec. 18, 2017

(65) Prior Publication Data
US 2018/0101013 A1 Apr. 12, 2018

Related U.S. Application Data

(63) Continuation of application No. 15/147,638, filed on May 5, 2016, now Pat. No. 9,958,682, which is a
(Continued)

(51) Int. Cl.
*G02B 27/01* (2006.01)
*G06F 3/01* (2006.01)
(Continued)

(52) U.S. Cl.
CPC ......... *G02B 27/0172* (2013.01); *G02B 26/10* (2013.01); *G02B 27/0081* (2013.01);
(Continued)

(58) Field of Classification Search
CPC ........ G02B 27/0172; G02B 2027/0178; G02B 2027/0141; G02B 27/017;
(Continued)

(56) References Cited

U.S. PATENT DOCUMENTS 3,408,133 A 10/1968 Lee
3,712,716 A 1/1973 Cornsweet et al.
(Continued)

FOREIGN PATENT DOCUMENTS

JP 61-198892 A 9/1986
JP 10-319240 A 12/1998
(Continued)

OTHER PUBLICATIONS

Amitai, "P-27: A Two-dimensional Aperture Expander for Ultra-Compact, High-Performance Head-Worn Displays," *SID Symposium Digest of Technical Papers*, vol. 36, No. 1 (2005), pp. 360-363.
(Continued)

*Primary Examiner* — Jade R Chwasz
(74) *Attorney, Agent, or Firm* — Thomas Mahon

(57) ABSTRACT

Systems, devices, and methods for optical splitters are described. An optical splitter includes a transparent polygonal structure having an input side to receive light from a light source and an output side that is segmented into multiple facets. Each facet is engineered to provide a respective planar surface that is oriented at a different angle in each of at least two spatial dimensions relative to the other facets in order to refract and route a respective portion of the light along a respective set of optical paths. The input side may be faceted as well to further refine the optical paths. A particular application of the polygonal structure in an optical splitter providing eyebox expansion by exit pupil replication in a scanning laser-based wearable heads-up display is described in detail.

13 Claims, 9 Drawing Sheets

Related U.S. Application Data continuation-in-part of application No. 15/046,254, filed on Feb. 17, 2016, now Pat. No. 9,989,764.

(60) Provisional application No. 62/242,844, filed on Oct. 16, 2015, provisional application No. 62/156,736, filed on May 4, 2015, provisional application No. 62/117,316, filed on Feb. 17, 2015.

(51) Int. Cl.

| | | |
|---|---|---|
| G02B 26/10 | (2006.01) | |
| G06F 1/16 | (2006.01) | |
| G02B 27/00 | (2006.01) | |
| G03H 1/26 | (2006.01) | |
| G09G 3/00 | (2006.01) | |
| G02B 27/12 | (2006.01) | |

(52) U.S. Cl.
CPC ........... *G02B 27/017* (2013.01); *G02B 27/12* (2013.01); *G03H 1/265* (2013.01); *G03H 1/2645* (2013.01); *G06F 1/163* (2013.01); *G06F 3/011* (2013.01); *G06F 3/013* (2013.01); *G09G 3/001* (2013.01); *G02B 2027/0112* (2013.01); *G02B 2027/0123* (2013.01); *G02B 2027/0125* (2013.01); *G02B 2027/0174* (2013.01); *G02B 2027/0178* (2013.01); *G03H 2001/266* (2013.01)

(58) Field of Classification Search
CPC .... G02B 2027/0125; G02B 2027/0174; G02B 2027/0187; G02B 27/0101; G02B 2027/013; G02B 2027/0123; G02B 5/32; G02B 27/01; G02B 27/0176; G02B 2027/015; G03H 1/0005; G03H 1/0252; G03H 1/0866; G03H 2001/2236; G03H 2225/52; G03H 2270/55; G03H 1/2645; G03H 1/264; G03H 2001/266; H04N 13/044

USPC ...... 359/3, 9, 10, 11, 13, 14, 15, 21, 22, 24, 359/27, 32, 35

See application file for complete search history.

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,231,674 A | 7/1993 | Cleveland et al. | |
| 5,467,104 A | 11/1995 | Furness, III et al. | |
| 5,589,956 A | 12/1996 | Morishima et al. | |
| 5,596,339 A | 1/1997 | Furness, III et al. | |
| 5,742,421 A | 4/1998 | Wells et al. | |
| 5,760,931 A | 6/1998 | Saburi et al. | |
| 6,008,781 A | 12/1999 | Furness, III et al. | |
| 6,027,216 A | 2/2000 | Guyton et al. | |
| 6,139,146 A | 10/2000 | Zhang | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,545,778 B2 | 4/2003 | Ono et al. | |
| 6,639,570 B2 | 10/2003 | Furness, III et al. | |
| 6,972,734 B1 | 12/2005 | Ohshima et al. | |
| 7,473,888 B2 | 1/2009 | Wine et al. | |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,560,976 B1 | 10/2013 | Kim | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,477,079 B2 | 10/2016 | Bailey et al. | |
| 9,766,449 B2 | 9/2017 | Bailey et al. | |
| 9,989,764 B2 | 6/2018 | Alexander et al. | |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2004/0174287 A1 | 9/2004 | Deak | |
| 2005/0012715 A1 | 1/2005 | Ford | |
| 2006/0238707 A1 | 10/2006 | Elvesjo et al. | |
| 2007/0078308 A1 | 4/2007 | Daly | |
| 2007/0132785 A1 | 6/2007 | Ebersole, Jr. et al. | |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 | 3/2010 | Sugiyama et al. | |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0239776 A1 | 9/2010 | Yajima et al. | |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |

(56) References Cited

U.S. PATENT DOCUMENTS

| | | |
|---|---|---|
| 2015/0268821 A1 | 9/2015 | Ramsby et al. |
| 2015/0325202 A1 | 11/2015 | Lake et al. |
| 2015/0362734 A1 | 12/2015 | Moser et al. |
| 2015/0378162 A1 | 12/2015 | Bailey et al. |
| 2016/0033771 A1 | 2/2016 | Tremblay et al. |
| 2016/0202081 A1 | 7/2016 | Debieuvre et al. |
| 2016/0238845 A1 | 8/2016 | Alexander et al. |
| 2016/0274365 A1 | 9/2016 | Bailey et al. |
| 2016/0274758 A1 | 9/2016 | Bailey |
| 2016/0327796 A1 | 11/2016 | Bailey et al. |
| 2016/0327797 A1 | 11/2016 | Bailey et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0377865 A1 | 12/2016 | Alexander et al. |
| 2017/0068095 A1 | 3/2017 | Holland et al. |
| 2017/0097753 A1 | 4/2017 | Bailey et al. |
| 2017/0115483 A1 | 4/2017 | Aleem et al. |
| 2017/0153701 A1 | 6/2017 | Mahon et al. |
| 2017/0205876 A1 | 7/2017 | Vidal et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0299956 A1 | 10/2017 | Holland et al. |
| 2017/0343796 A1 | 11/2017 | Bailey et al. |
| 2017/0343797 A1 | 11/2017 | Bailey et al. |
| 2018/0007255 A1 | 1/2018 | Tang |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2014/155288 A2 | 10/2014 |
| WO | 2015/123775 A1 | 8/2015 |

OTHER PUBLICATIONS

Ayras et al., "Exit pupil expander with a large field of view based on diffractive optics," *Journal of the SID*, vol. 17, No. 8 (2009), pp. 659-664.
Chellappan et al., "Laser-based display: a review," *Applied Optics*, vol. 49, No. 25 (2010), pp. 79-98, Jul. 31, 2019.
Cui et al., "Diffraction from angular multiplexing slanted volume hologram gratings," *Optik*, vol. 116 (2005), pp. 118-122.
Curatu et al., "Dual Purpose Lens for an Eye-tracked Projection Head-Mounted Display," *International Optical Design Conference 2006*, SPIE-OSA, vol. 6342 (2007), pp. 63420X-1-63420X-7.
Curatu et al., "Projection-based head-mounted display with eye-tracking capabilities," *Proc. of SPIE*, vol. 5875 (2005), pp. 58750J-1-58750J-9.
Essex, "Tutorial on Optomechanical Beam Steering Mechanisms," College of Optical Sciences, University of Arizona, 2006, 8 pages.
Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.
Hainich et al., "Chapter 10: Near-Eye Displays," in: *Displays—Fundamentals & Applications*, 2011, pp. 439-503.
Hornstein et al., "Maradin's Micro-Mirror—System Level Synchronization Notes," *SID 2012 Digest* (2012), pp. 981-984.
International Search Report and Written Opinion, dated Apr. 25, 2017, for International Application No. PCT/US2016/067246, 10 pages.
International Search Report and Written Opinion, dated Dec. 8, 2016, for International Application No. PCT/US2016/050225, 15 pages.
International Search Report and Written Opinion, dated Jan. 18, 2017, for International Application No. PCT/US2016/054852, 12 pages.
International Search Report and Written Opinion, dated Jun. 8, 2016, for International Application No. PCT/US2016/018293, 17 pages.
International Search Report and Written Opinion, dated Jun. 8, 2016, for International Application No. PCT/US2016/018298, 14 pages.
International Search Report and Written Opinion, dated Jun. 8, 2016, for International Application No. PCT/US2016/018299, 12 pages.
International Search Report and Written Opinion, dated Oct. 13, 2017, for International Application No. PCT/US2017/040323, 16 pages.
International Search Report and Written Opinion, dated Sep. 28, 2017, for International Application No. PCT/US2017/027479, 13 pages.
Itoh et al., "Interaction-free calibration for optical see-through head-mounted displays based on 3D eye localization," *2014 IEEE Symposium on 3D User Interfaces* (3DUI), (2014), pp. 75-82.
Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.
Kessler, "Optics of Near to Eye Displays (NEDs)," *Oasis 2013*, Tel Aviv, Israel, Feb. 19, 2013, 37 pages.
Kress et al., "A review of head-mounted displays (HMD) technologies and applications for consumer electronics," *Proc. of SPIE*, vol. 8720 (2013), pp. 87200A-1-87200A-13.
Kress et al., "Diffractive and Holographic Optics as Optical Combiners in Head Mounted Displays," *Proceedings of the 2013 ACM Conference on Pervasive and Ubiquitous Computing Adjunct Publication*, Zurich, Switzerland, Sep. 8-12, 2013, pp. 1479-1482.
Kress, "Optical architectures for see-through wearable displays," *Bay Area—SID Seminar*, Bay Area, Apr. 30, 2014, 156 pages.
Levola, "7.1: Invited Paper: Novel Diffractive Optical Components for Near to Eye Displays," *SID Symposium Digest of Technical Papers*, vol. 37, No. 1 (2006), pp. 64-67.
Liao et al., "The Evolution of MEMS Displays," *IEEE Transcations on Industrial Electronics*, vol. 56, No. 4 (2009), pp. 1057-1065.
Lippert, "Chapter 6: Display Devices: RSD (Retinal Scanning Display)," in: *The Avionics Handbook*, 2001, 8 pages.
Majaranta et al., "Chapter 3: Eye-Tracking and Eye-Based Human-Computer Interaction," in *Advances in Physiological Computing*, 2014, pp. 39-65.
Merriam-Webster, "Radio Frequencies" retrieved from https://www.merriam-webster.com/table/collegiate/radiofre.htm, retrieved on Jul. 12, 2017, 2 pages.
Schowengerdt et al., "Stereoscopic retinal scanning laser display with integrated focus cues for ocular accommodation," *Proc. of SPIE-IS&T Electronic Imaging*, vol. 5291 (2004), pp. 366-376.
Silverman et al., "58.5L: Late-News Paper: Engineering a Retinal Scanning Laser Display with Integrated Accommodative Depth Cues," *SID 03 Digest*, (2003), pp. 1538-1541.
Takatsuka et al., "Retinal projection display using diffractive optical element," *Tenth International Conference on Intelligent Information Hiding and Multimedia Signal Processing*, IEEE, (2014), pp. 403-406.
Urey et al., "Optical performance requirements for MEMS-scanner based microdisplays," *Conf. on MOEMS and Miniaturized Systems*, SPIE, vol. 4178 (2000), pp. 176-185.
Urey, "Diffractive exit-pupil expander for display applications," *Applied Optics*, vol. 40, No. 32 (2001), pp. 5840-5851.
Viirre et al., "The Virtual Retina Display: A New Technology for Virtual Reality and Augmented Vision in Medicine," *Proc. of Medicine Meets Virtual Reality* (1998), pp. 252-257.

SYSTEMS, DEVICES, AND METHODS FOR SPLITTER OPTICS IN WEARABLE HEADS-UP DISPLAYS

TECHNICAL FIELD

The present systems, devices, and methods generally relate to splitter optics and particularly relate to splitter optics for use in expanding the eyebox of scanning laser-based wearable heads-up display.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A wearable heads-up display ("WHUD") may be summarized as including: a support structure that in use is worn on a head of a user; a scanning laser projector carried by the support structure; a holographic combiner carried by the support structure, wherein the holographic combiner is positioned within a field of view of an eye of the user when the support structure is worn on the head of the user; and an optical splitter carried by the support structure and positioned in an optical path between the scanning laser projector and the holographic combiner, wherein the optical splitter includes a transparent polygonal structure that comprises: an input side oriented to receive laser light from the scanning laser projector and in-couple the laser light into a volume of the optical splitter; and an output side having at least N facets, where N is an integer greater than 1, each of the N facets oriented to out-couple a respective portion of the laser light from the volume of the optical splitter and direct the respective portion of the laser light along a respective optical path towards the holographic combiner, and wherein the holographic combiner comprises at least one hologram positioned and oriented to receive the respective portions of the laser light from the N facets of the optical splitter and redirect each respective portion of the laser light towards a respective one of N exit pupils at the eye of the user. Each of the N facets of the output side of the optical splitter may be oriented to direct a respective portion of the laser light from the scanning laser projector along a respective optical path towards the holographic combiner effectively from a different respective one of N spatially-separated virtual positions for the scanning laser projector.

The N facets of the output side of the optical splitter may include at least four facets arranged in an array with at least two rows of facets and at least two columns of facets, and each one of the N facets of the output side of the optical splitter may share a first edge with a first other one of the N facets of the output side of the optical splitter and a second edge with a second other one of the N facets of the output side of the optical splitter. The output side of the optical splitter may include N=4 facets arranged in a two-by-two array, each one of the N=4 facets comprising a respective rectangular surface oriented at a different angle in three-dimensional space relative to the other ones of the N=4 facets. Each one of the N=4 facets may be oriented to at least partially face away from each of the other ones of the N=4 facets. A respective first vertex of each one of the N=4 facets may mate with the respective first vertices of each of the other ones of the N=4 facets to form a vertex on a convex outer surface of the output side of the optical splitter.

Each of the N facets of the output side of the optical splitter may comprise a respective planar surface. The planar surface of each one of the N facets of the output side of the optical splitter may be oriented at a different angle in each of at least two spatial dimensions relative to the other ones of the N facets of the output side of the optical splitter. The planar surface of each one of the N facets of the output side of the optical splitter may be oriented in a respective plane that intersects each of the respective planes of the other ones of the N facets along a respective line of intersection. No line of intersection between the respective planes of any pair of facets among the N facets may be parallel to any other line of intersection between the respective planes of any other pair of facets among the N facets.

The input side of the optical splitter may include at least M facets, where M is an integer greater than 1. Each of the M facets may be oriented to in-couple a respective portion of the laser light from scanning laser projector into the volume of the optical splitter and direct the respective portion of the laser light towards a respective subset of P of the N facets on the output side of the optical splitter, where P is an integer less than or equal to N. The number N of facets on the output side of the optical splitter may be greater than the number M of facets on the input side of the optical splitter. P may be less than N. The input side of the optical splitter may include M=2 facets, and a first edge of a first one of the M=2 facets may mate with a first edge of a second one of the M=2 facets. The first facet and the second facet may be oriented to at least partially face one another and form an obtuse angle on a concave outer surface of the input side of the optical splitter. Each of the M facets of the input side of the optical splitter may comprise a respective planar surface. The planar surface of each one of the M facets of the input side of the optical splitter may be oriented at a different angle in at least one spatial dimension relative to the other ones of the M facets of the input side of the optical splitter and relative to each of the N facets of the output side of the optical splitter.

The optical splitter may comprise multiple separate pieces that are bonded together.

An optical splitter including a transparent polygonal structure may be summarized as including: an input side oriented to receive light from a light source and in-couple the light into a volume of the optical splitter; and an output side having at least N facets, where N is an integer greater than 1, each of the N facets oriented to out-couple a respective portion of the light from the volume of the optical splitter and direct the respective portion of the light away from the optical splitter along a different respective optical path, wherein each of the N facets comprises a respective planar surface that is oriented: at a different angle in each of at least two spatial dimensions relative to the respective planar surfaces of the other ones of the N facets; and in a respective plane that intersects each of the respective planes of the other ones of the N facets along a respective line of intersection, wherein no line of intersection between the respective planes of any pair of facets among the N facets is parallel to any other line of intersection between the respective planes of any other pair of facets among the N facets.

The N facets may include at least four facets arranged in an array with at least two rows of facets and at least two columns of facets. Each one of the N facets may share a first edge with a first other one of the N facets and a second edge with a second other one of the N facets. The output side may include N=4 facets arranged in a two-by-two array. Each one of the N=4 facets may comprise a respective rectangular surface oriented at a different angle in three-dimensional space relative to the other ones of the N=4 facets. Each one of the N=4 facets may be oriented to at least partially face away from each of the other ones of the N=4 facets and a respective first vertex of each one of the N=4 facets may mate with the respective first vertices of each of the other ones of the N=4 facets to form a vertex on a convex outer surface of the output side.

The input side may include at least M facets, where M is an integer greater than 1. Each of the M facets may be oriented to in-couple a respective portion of the light from the light source into the volume of the optical splitter and direct the respective portion of the light towards a respective subset of P of the N facets on the output side, where P is an integer less than or equal to N. The number N of facets on the output side may be greater than the number M of facets on the input side. P may be less than N. The input side may include M=2 facets, and a first edge of a first one of the M=2 facets may mate with a first edge of a second one of the M=2 facets. The first one of the M facets and the second one of the M facets may be oriented to at least partially face one another and form an obtuse angle on a concave outer surface of the input side. Each of the M facets of the input side may comprise a respective planar surface. The planar surface of each one of the M facets of the input side may be oriented at a different angle in at least one spatial dimension relative to the other ones of the M facets of the input side and relative to each of the N facets of the output side.

The transparent polygonal structure may comprise multiple separate pieces that are bonded together.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
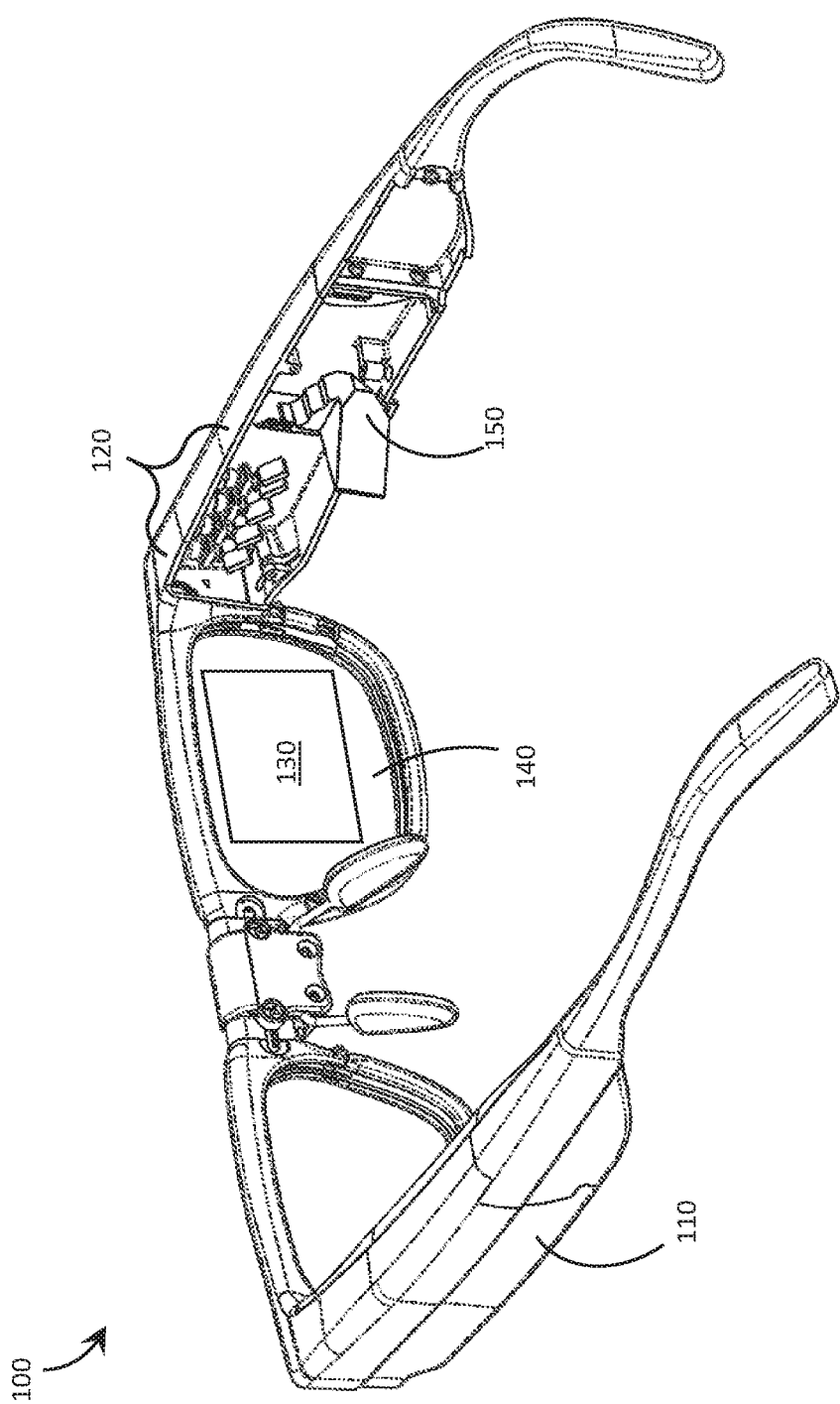
FIG. 1 is a partial-cutaway perspective view of a wearable heads-up display that employs an optical splitter to provide a large eyebox made up of multiple optically-replicated exit pupils in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for splitter optics that, among other potential applications, have particular utility in eyebox expansion in scanning laser-based wearable heads-up displays ("WHUDs"). Generally, a scanning laser-based WHUD is a form of virtual retina display in which a scanning laser projector ("SLP") draws a raster scan onto the eye of the user. In the absence of any further measure the SLP projects light over a fixed area called the exit pupil of the display. In order for the user to see displayed content the exit pupil typically needs to align with, be encompassed by, or overlap with the entrance pupil of the user's eye. The full resolution and/or field of view of the display is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead but the eye's pupil may quickly leave the eyebox if and when the user glances anywhere off-center. A larger eyebox may be achieved by increasing the size of the exit pupil but this typically comes at the cost of reducing the display resolution and/or field of view. In accordance with the present systems, devices, and methods, the eyebox of a scanning laser-based WHUD may be expanded by optically replicating or repeating a relatively small exit pupil and spatially distributing multiple copies or instances of the exit pupil over a relatively larger area of the user's eye, compared to the area of the single exit pupil on its own. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user. In other words, the present systems, devices, and methods describe eyebox expansion by exit pupil replication in scanning laser-based WHUDs.

Throughout this specification and the appended claims, the term "replication" is used (e.g., in the context of "exit pupil replication") to generally refer to situations where multiple instances of substantially the same exit pupil and/or display content are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil. In many examples, the present systems, devices, and methods provide exit pupil replication by exit pupil repetition or sequential exit pupil tiling. Unless the specific context requires otherwise, references to "exit pupil replication" herein include exit pupil replication by exit pupil repetition.

FIG. 1 is a partial-cutaway perspective view of a WHUD 100 that employs an optical splitter 150 to provide a large eyebox made up of multiple optically-replicated exit pupils in accordance with the present systems, devices, and methods. WHUD 100 includes a support structure 110 that in use is worn on the head of a user and has a general shape and appearance of an eyeglasses (e.g., sunglasses) frame. Support structure 110 carries multiple components, including: a SLP 120, a holographic combiner 130, and optical splitter 150. Portions of SLP 120 and optical splitter 150 may be contained within an inner volume of support structure 110; however, FIG. 1 provides a partial-cutaway view in which regions of support structure 110 have been removed in order to render visible portions of SLP 120 and optical splitter 150 that may otherwise be concealed.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects therebetween.

SLP 120 may include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 120 may be communicatively coupled to (and support structure 110 may further carry) a processor and a non-transitory processor-readable storage medium or memory storing processor-executable data and/or instructions that, when executed by the processor, cause the processor to control the operation of SLP 120. For ease of illustration, FIG. 1 does not call out a processor or a memory.

Holographic combiner 130 is positioned within a field of view of at least one eye of the user when support structure 110 is worn on the head of the user. Holographic combiner 130 is sufficiently optically transparent to permit light from the user's environment (i.e., "environmental light") to pass through to the user's eye. In the illustrated example of FIG. 1, support structure 110 further carries a transparent eyeglass lens 140 (e.g., a prescription eyeglass lens or a non-prescription lens) and holographic combiner 130 comprises at least one layer of holographic material that is adhered to, affixed to, laminated with, carried in or upon, or otherwise integrated with eyeglass lens 140. The at least one layer of holographic material may include a photopolymer film such as Bayfol®HX available from Bayer MaterialScience AG or a silver halide compound and may, for example, be integrated with transparent lens 140 using any of the techniques described in U.S. Provisional Patent Application Ser. No. 62/214,600. Holographic combiner 130 includes at least one hologram in or on the at least one layer of holographic material. With holographic combiner 130 positioned in a field of view of an eye of the user when support structure 110 is worn on the head of the user, the at least one hologram of holographic combiner 130 is positioned and oriented to redirect light originating from SLP 120 towards the eye of the user. In particular, the at least one hologram is positioned and oriented to receive light signals that originate from SLP 120 and converge those light signals to at least one exit pupil at or proximate the eye of the user.

Optical splitter 150 is positioned in an optical path between SLP 120 and holographic combiner 130. Optical splitter 150 comprises a transparent polygonal structure that includes: i) an input side that is oriented to receive laser light (i.e., "light signals") generated and output by SLP 120 and in-couple the laser light into a volume of the optical splitter, and ii) an output side that is oriented to out-couple the laser light from the volume of the optical splitter and redirect (e.g., refract) the laser light towards holographic combiner 130. As will be discussed in more detail herein, the output side of the transparent polygonal structure of optical splitter 150 includes at least N facets (where N is an integer greater than 1), with each of the N facets oriented to out-couple a respective portion of the laser light (e.g., a respective light signal or a respective set/range of light signals) from the volume of the polygonal structure and direct the respective portion of the laser light (or light signal) along a respective optical path towards holographic combiner 130. Depending on the specific implementation, each one of the N facets may direct each such light signal towards holographic combiner 130 effectively from a respective one of multiple (e.g., N) spatially-separated "virtual positions" for SLP 120. Advantageously, optical splitter 150 may be a static and passive component that, without power consumption or any moving parts, receives (at a first point of incidence therein or thereon) a first light signal generated by SLP 120 and routes/redirects the first light signal along an optical path towards holographic combiner 130 that traces back to (if optical splitter 150 is ignored during trace back) one of N spatially-separated virtual positions for SLP 120. The particular one of the N spatially-separated virtual positions for SLP 120 from which the first light signal is redirected by optical splitter 150 is determined by the first point of incidence at which the first light signal is received by optical splitter 150. In other words, from the point of view of holographic combiner 130, optical splitter 150 causes at least some light signals generated by SLP 120 to appear to originate (i.e., "effectively" originate) from N spatially-separated "virtual positions" for SLP 120 as opposed to from the real position for SLP 120.

Throughout this specification and the appended claims, reference is often made to one or more "virtual position(s)" such as "N spatially-separated virtual positions for a SLP." The "real position" of an object is its actual position in real, three dimensional space. A "virtual position" of an object is a position in real space at which the optics of a system cause light from the object to effectively originate even though the real position of the object may be elsewhere. In other words, the optics of the system cause light from the object to follow optical paths that would trace back, if the optics of the system were ignored during the trace back, to a "virtual position" in space that is spatially-separated from the object's "real position" in space. As a simple example, an object in front of a planar mirror has a "virtual position" on the other side of the planar mirror. A "virtual position" may be a result of one or more intervening optical element(s) in an optical path. When one or more optical element(s) redirects light signals from a SLP, a virtual position for the SLP refers to the position in real space at which the SLP would need to be located in order to provide light signals having that same trajectory without any intervening optics. The optics of the system cause the light signals to follow a trajectory that would correspond to a different point of origin if there were no such optics in the system. The light signals appear to have "effectively" originated from a different, or "virtual," position for the SLP.

Figure 2A:
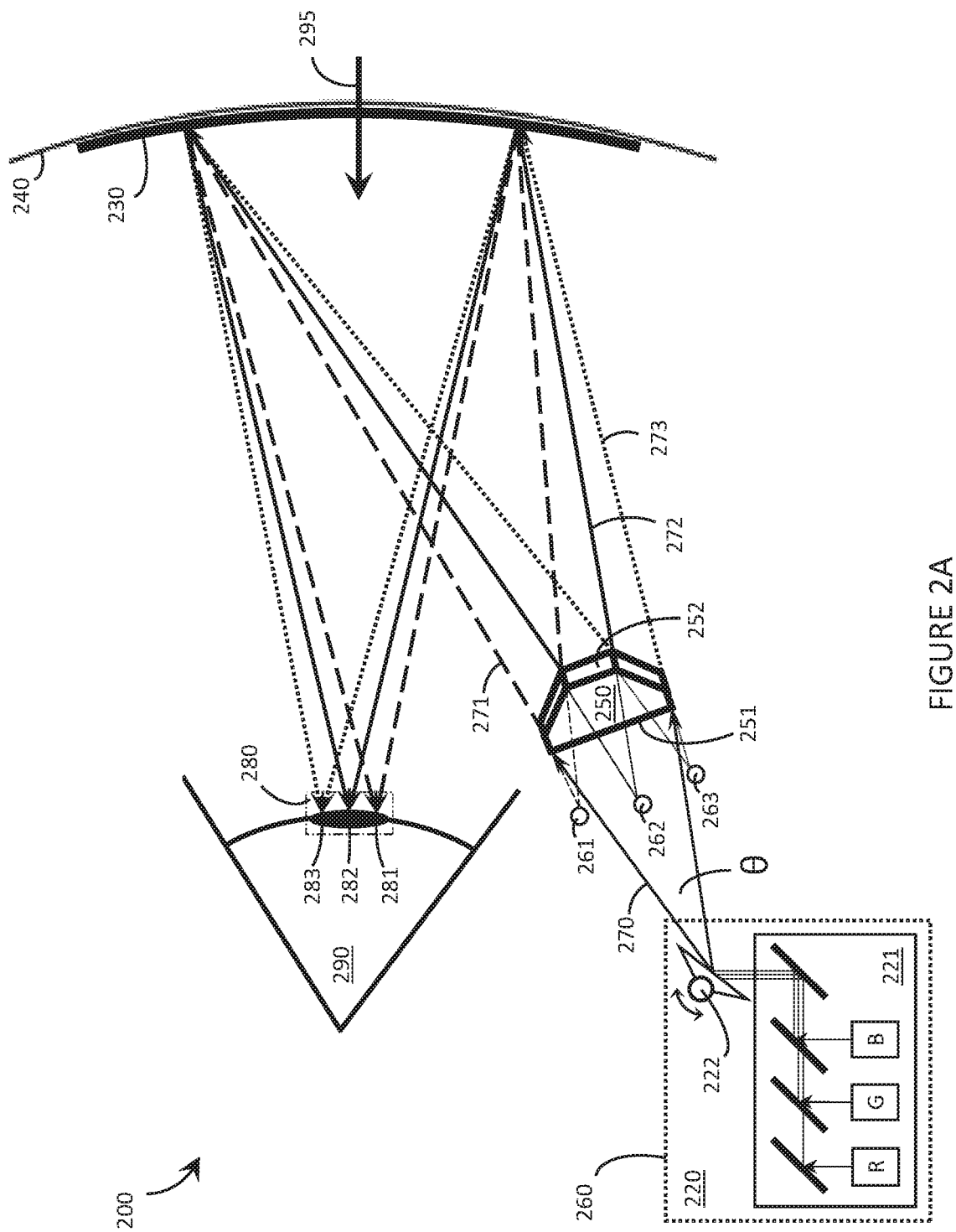
FIG. 2A is an illustrative diagram of a wearable heads-up display showing an optical splitter in operation for the purpose of eyebox expansion by exit pupil replication in accordance with the present systems, devices, and methods.

FIG. 2A is an illustrative diagram of a WHUD 200 showing an optical splitter 250 in operation for the purpose of eyebox expansion by exit pupil replication in accordance with the present systems, devices, and methods. WHUD 200 may be substantially similar to WHUD 100 from FIG. 1, although in FIG. 2A no support structure (e.g., support structure 110) is illustrated in order to reduce clutter. As with WHUD 100, WHUD 200 comprises a SLP 220 (which includes a RGB laser module 221 and at least one MEMS-based scan mirror 222), a holographic combiner 230 carried by an eyeglass lens 240, and the optical splitter 250. As previously described, the combination of holographic combiner 230 and eyeglass lens 240 is sufficiently transparent to allow environmental light 295 to pass through to the eye 290 of the user.

SLP 220 is located at a position 260 (i.e., a "real" position) relative to holographic combiner 230 and is shown generating (e.g., projecting) a set of light signals 270. Light signals 270 correspond to a first sweep of a total scan range (e.g., a total two-dimensional scan range, with only one dimension visible in the view of FIG. 2A) $\theta$ by SLP 220 and may collectively represent, for example, a projection by SLP 220 of a first image, or a first frame of a video, or generally a first frame of display content for WHUD 200.

Optical splitter 250 is positioned in an optical path between SLP 220 and holographic combiner 230 such that optical splitter 250 interrupts (e.g., receives) light signals 270 en route from SLP 220 to holographic combiner 230. As previously described, optical splitter 250 includes a transparent polygonal structure that is positioned and/or oriented to redirect (e.g., refract) light signals 270 towards holographic combiner 230 effectively from N spatially-separated virtual positions 261, 262, and 263 for SLP 220. Particularly, optical splitter 250 separates, divides, branches, furcates, or generally "splits" light signals 270 into N groups, sets, ranges, or "sub-ranges" and redirects (e.g., refracts) each sub-range of light signals 270 along a respective range (or sub-range) of optical paths that effectively originates from a respective one of the N spatially-separated virtual positions 261, 262, and 263 for SLP 220.

In operation, scan mirror 222 of SLP 220 projects, guides, directs, or generally "sweeps" modulated light signals 270 over a range (or combination of ranges) of directions and/or angles in order to define a display image. A single scan mirror 222 is shown in FIG. 2A for simplicity though in alternative implementations an arrangement of two or more scan mirrors may be employed. The total range of available directions and/or angles over which SLP 220 (e.g., at least one scan mirror 222 of SLP 220) is operative to project light signals 270 is generally referred to herein as the total "scan range" and is denoted in FIG. 2A by the symbol $\theta$. Throughout this specification and the appended claims, the symbol $\theta$ is used to represent the total scan range (e.g., the total two-dimensional scan range) of a SLP (e.g., SLP 220) and includes all available directions and/or angles at which the SLP is operative to output light signals during normal use. Depending on the specific display content being projected by the SLP (e.g., depending on the specific modulation pattern of laser module 221), any particular direction and/or angle in the total scan range $\theta$ may correspond to any particular light signal (e.g., a red light signal, a green light signal, a blue light signal, any combination thereof, or no light signal at all) at any particular time. One "sweep" of the total scan range $\theta$ of a SLP 220 may produce one projected image, or one frame of a projected video or animation, or generally one frame of display content, where the composition of the display content depends on the modulation pattern of laser module 221 during the sweep. The SLPs described herein are generally operative to draw a raster scan and the "total scan range" generally encompasses the outer perimeter of the full raster scan that the SLP is operative to draw. This may be accomplished by, for example, a SLP that employs a single scan mirror operative to scan in two orthogonal dimensions or two separate scan mirrors that are each operative to scan in a respective one of two orthogonal dimensions.

The total two-dimensional scan range $\theta$ of a SLP may be broken down into a total scan range $\Omega$ in a first dimension corresponding to all available directions and/or angles of light signals in a first dimension (e.g., the horizontal dimension) that the SLP is operative to output during normal use, and a total scan range $\Psi$ in a second dimension corresponding to all available directions and/or angles of light signals in a second dimension (e.g., the vertical dimension) that the SLP is operative to output during normal use. Generally, $0°<\Omega<180°$ and $0°<\Psi<180°$, although in practice $\Omega$ and $\Psi$ may each be within a narrower range, such as $10°<\Omega<60°$, and $10°<\Psi<60°$. The relative values of $\Omega$ and $\Psi$ influence the aspect ratio of the WHUD. In other words, the total two-dimensional scan range $\theta$ may be made up of a first one-dimensional component $\Omega$ and a second (e.g., orthogonal) one-dimensional component $\Psi$, as $\theta=\Omega\times\Psi$. Generally, one "sweep" of a total scan range in a single dimension by a SLP refers to one instance of the scan mirror(s) of the SLP moving through all orientations or configurations that correspond to all available directions/angles for light signals in the dimension associated with that scan range. A sweep of the total scan range $\Omega$ in the first dimension by the SLP therefore corresponds to a sweep (e.g., by at least one scan mirror of the SLP) over or across all orientations or configurations that correspond to all available directions/angles for light signals in that first dimension and a sweep of the total scan range $\Psi$ in the second dimension by the SLP therefore corresponds to a sweep (e.g., by at least one scan mirror of the SLP) over or across all orientations or configurations that correspond to all available directions/angles for light signals in that second dimension. A sweep of a total two-dimensional scan range $\theta$, however, may involve multiple sweeps of the total scan ranges $\Omega$ and $\Psi$ in each of the first and the second dimensions, respectively. A common mode of operation for a SLP is to perform a respective sweep of the total scan range $\Omega$ in a first dimension (e.g., the horizontal dimension) at each discrete step or position along a sweep of the total scan range $\Psi$ in a second dimension (e.g., the vertical dimension). Whether or not a light signal is actually projected at any given direction/angle depends on the modulation pattern for the particular display content being projected at that time.

Returning to FIG. 2A, optical splitter 250 includes an input side 251 that is oriented to receive light signals 270 corresponding to a sweep of the total scan range $\theta$ by SLP 220 an in-couple those light signals into the volume of optical splitter 250. Optical splitter 250 also includes an output side 252 having N=3 facets (not individually called out in FIG. 2A to reduce clutter) that are positioned and/or oriented to out-couple the light signals from the volume of optical splitter 250, separate the light signals into N=3 sub-ranges $\varphi_i$ based on the point of incidence of each light signal 270 at optical splitter 250, where $\Sigma_{i=1}^{N}\varphi_i=\theta$, and redirect (e.g., refract) the light signals towards holographic combiner 230 effectively from each of the N=3 spatially-separated virtual positions 261, 262, and 263 for SLP 220.

Figure 2B:
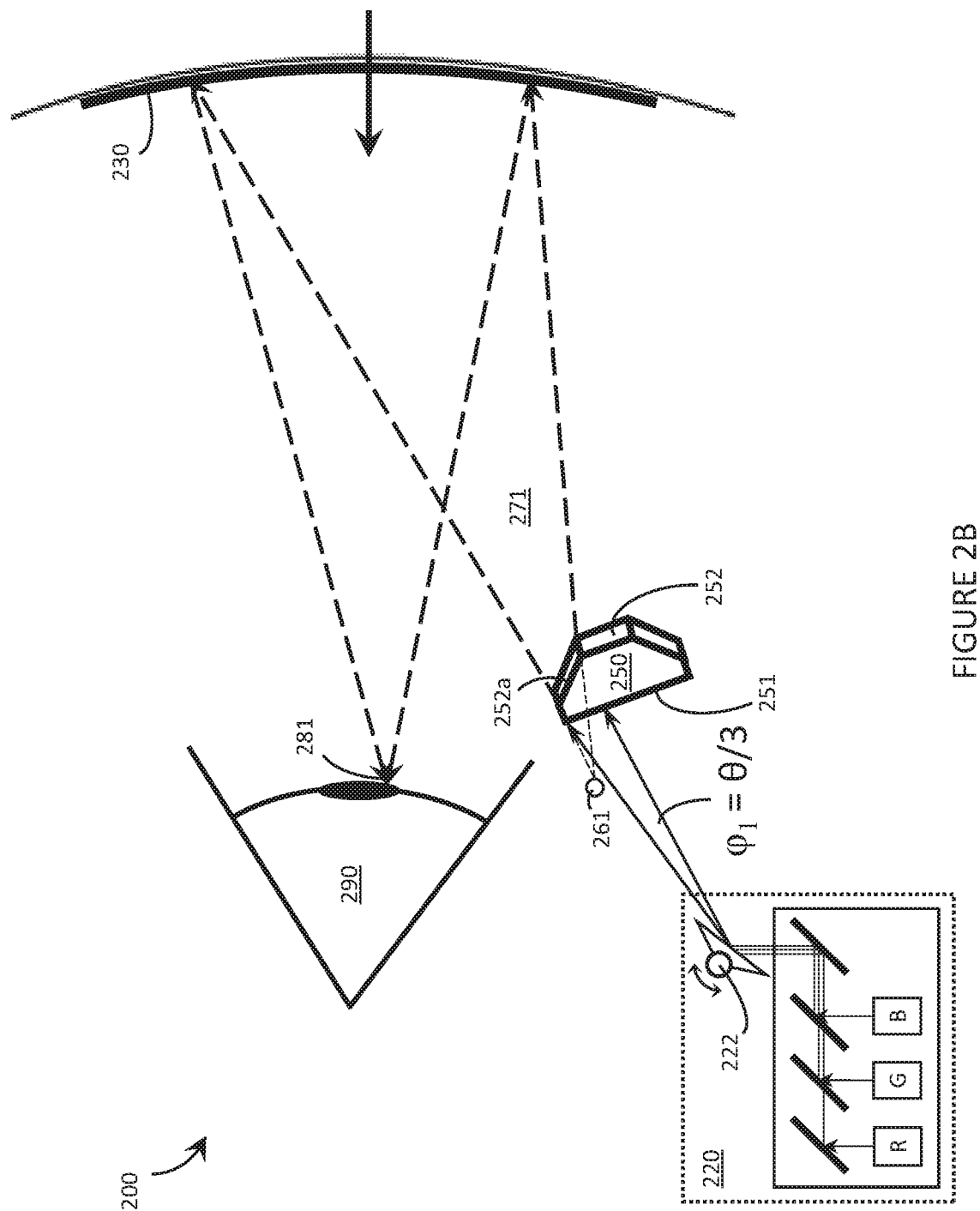
FIG. 2B is an illustrative diagram of the wearable heads-up display from FIG. 2A showing a sweep of a first sub-range $\varphi_1$ of the total scan range $\theta$ by the scanning laser projector (e.g., a partial sweep of the total scan range $\theta$) and the corresponding redirection of light signals from the first virtual position by the optical splitter in accordance with the present systems, devices, and methods.
Figure 2C:
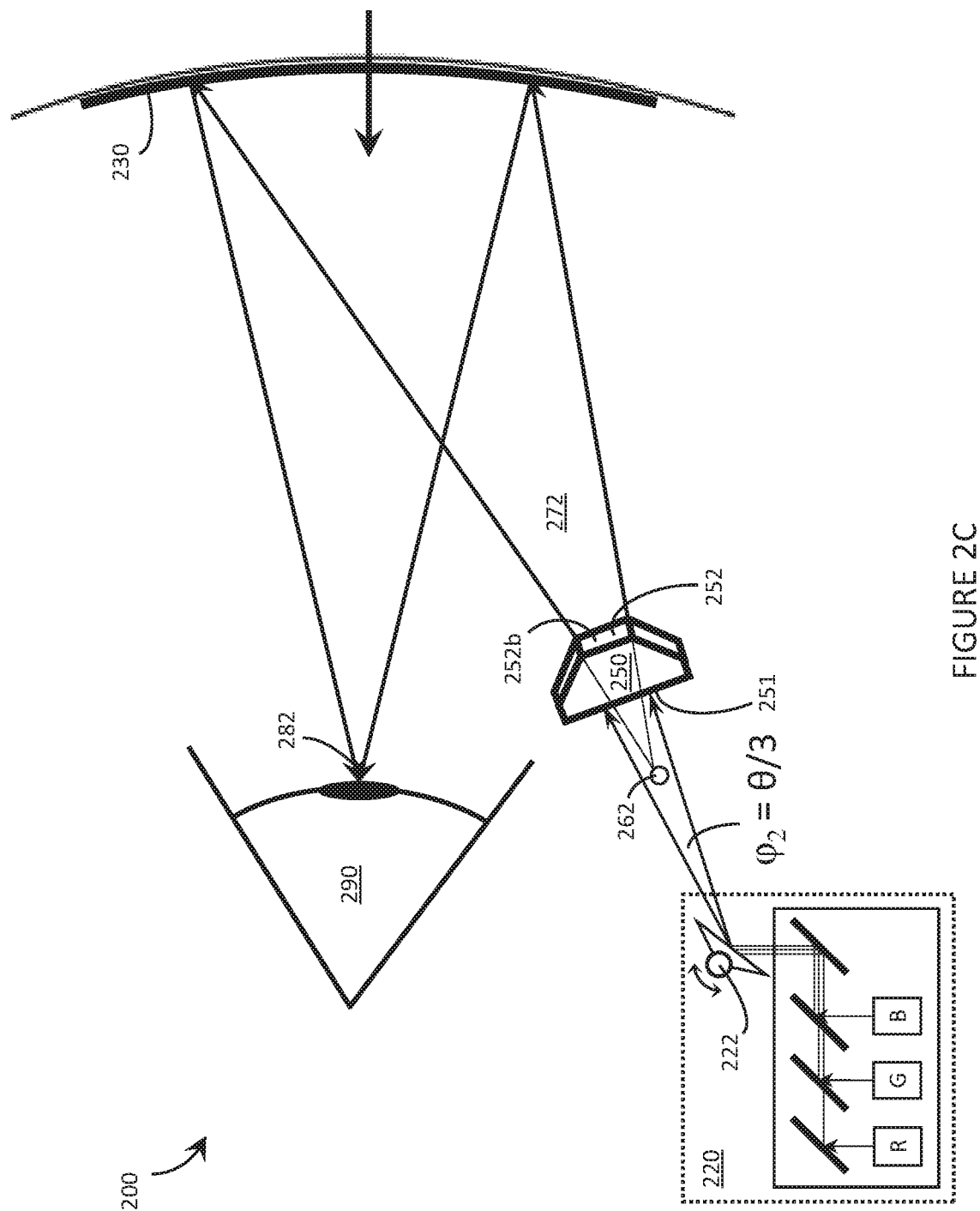
FIG. 2C is an illustrative diagram of the wearable heads-up display from FIGS. 2A and 2B showing a sweep of a second sub-range $\varphi_2$ of the total scan range $\theta$ by the scanning laser projector (e.g., a partial sweep of the total scan range $\theta$) and the corresponding redirection of light signals from the second virtual position by the optical splitter in accordance with the present systems, devices, and methods.
Figure 2D:
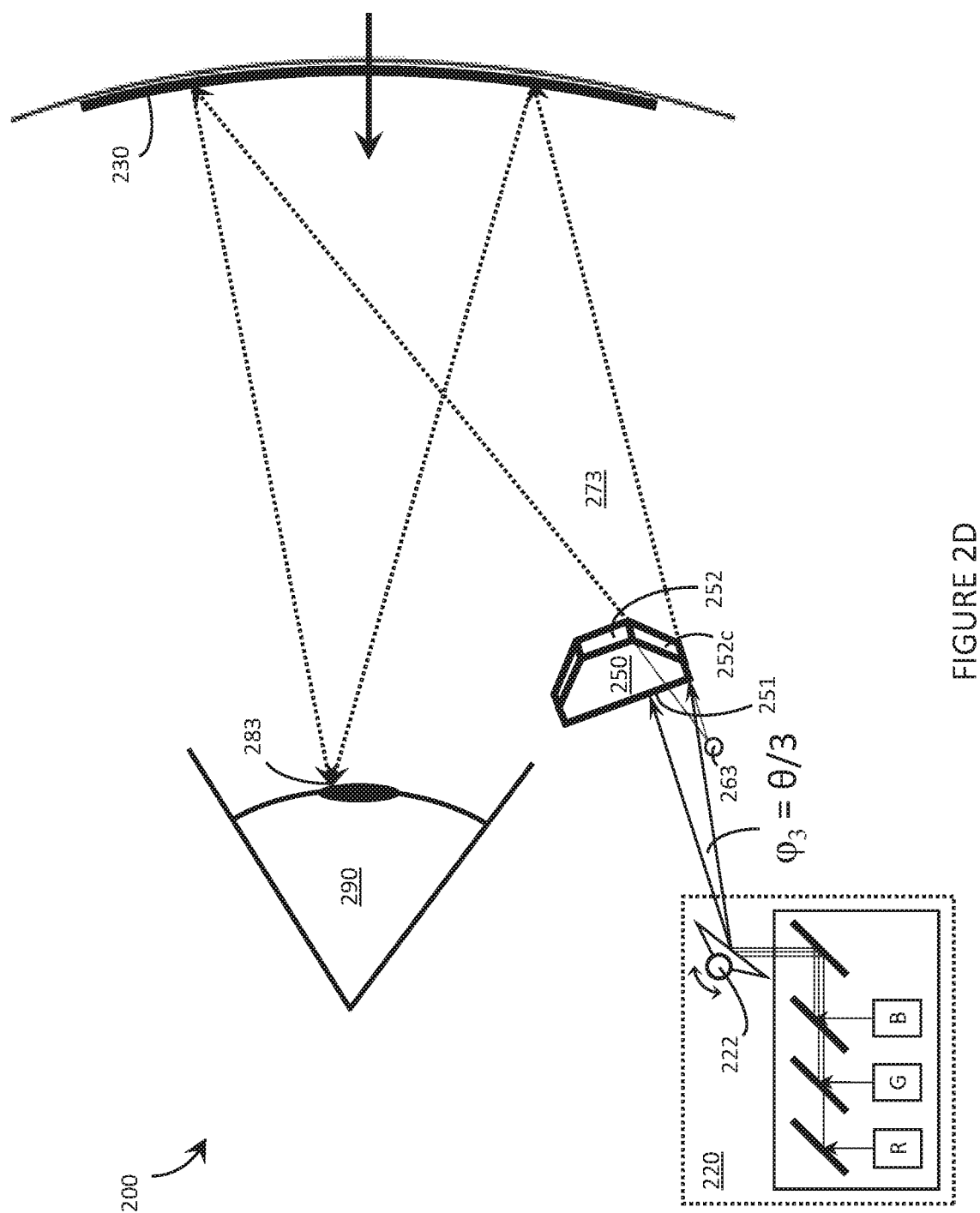
FIG. 2D is an illustrative diagram of the wearable heads-up display from FIGS. 2A 2B, and 2C showing a sweep of a third sub-range $\varphi_3$ of the total scan range $\theta$ by the scanning laser projector (e.g., a partial sweep of the total scan range $\theta$) and the corresponding redirection of light signals from the third virtual position by the optical splitter in accordance with the present systems, devices, and methods.

Each one of the N=3 sub-ranges $\varphi_i$ may correspond to a respective one of the N=3 spatially-separated virtual positions 261, 262, and 263 for SLP 220. The particular one of the N=3 virtual positions 261, 262, and 263 for SLP 220 from which each light signal 270 in the sweep of the total scan range θ is redirected by optical splitter 250 is determined by the particular one of the N=3 sub-ranges $\varphi_i$ to which the light signal 270 corresponds. In the view of the illustrated example, N=3 sub-ranges (e.g., $\varphi_1$, $\varphi_2$, and $\varphi_3$ respectively, but not individually called out to reduce clutter) and each sub-range includes a respective set of light signals 271, 272, and 273 that together make up light signals 270. That is, optical splitter 250 splits or separates light signals 270 into a first sub-range $\varphi_1$ comprising light signals 271 (represented by lines with large dashes), a second sub-range $\varphi_2$ comprising light signals 272 (represented by solid lines), and a third sub-range $\varphi_3$ comprising light signals 273 (represented by dotted lines). Optical splitter 250 redirects the light signals so that first light signals 271 effectively originate from first virtual position 261, second light signals 272 effectively originate from second virtual position 262, and third light signals 273 effectively originate from third virtual position 263. Successive individual ones of the N=3 sub-ranges $\varphi_1$, $\varphi_2$, and $\varphi_3$ corresponding to respective ones of first light signals 271, second light signals 272, and third light signals 273 are depicted in FIGS. 2B, 2C, and 2D respectively.

Each of the N=3 virtual positions 261, 262, and 263 for SLP 220 is spatially-separated from real position 260 for SLP 220, so the optical paths between each of virtual positions 261, 262, and 263 for SLP 220 (corresponding to first light signal 271, second light signals 272, and third light signals 273, respectively) and holographic combiner 230 are different from the optical paths between real position 260 for SLP 220 and holographic combiner 230. For example, the optical paths of light signals 271 are different from the optical paths of light signals 272 and the optical paths of light signals 273 are different from the optical paths of both light signals 271 and light signals 272. Advantageously, each of the N=3 virtual positions 261, 262, and 263, for SLP 220 may correspond to a respective position and orientation of SLP 220. In other words, relative to the other ones of the N=3 virtual positions 261, 262, and 263 for SLP 220, each one of the virtual positions 261, 262, and 263 may correspond to a respective displacement and rotation of SLP 220. Such is the case in WHUD 200 for which, as would be apparent to one of ordinary skill in the art, a line connecting each of the N=3 virtual positions 261, 262, and 263 for SLP 220 in FIG. 2A would be a curved line.

As previously described, holographic combiner 230 includes at least one hologram that is operative (e.g., designed, crafted, encoded, recorded, and/or generally positioned and oriented) to redirect light signals 270 received from the N=3 facets of optical splitter 250 towards the eye 290 of the user. In the illustrated implementation, the at least one hologram of holographic combiner 230 converges respective ones of light signals 271, 272, and 273 to respective ones of N=3 exit pupils 281, 282, and 283 at or proximate eye 290. The particular exit pupil 281, 282, and 283 to which a light signal is converged by holographic combiner 230 depends on (e.g., is determined by) the particular virtual position 261, 262, and 263 for SLP 220 from which the light signal is redirected by optical splitter 250. Thus, optical splitter 250 splits light signals 270 into N=3 groups (light signals 271, 272, and 273) or sub-ranges ($\varphi_1$, $\varphi_2$, and $\varphi_3$) and redirects each group or sub-range to holographic combiner 230 in such a way (e.g., effectively from such a virtual position) that each group or sub-range is converged by holographic combiner 230 to a respective one of N=3 spatially-separated exit pupils 281, 282, and 283 at eye 290. The total eyebox 280 of WHUD 200 encompasses all three spatially-separated exit pupils 281, 282, and 283. If optical splitter 250 was not present then the total eyebox 280 of WHUD 200 would be composed of a single exit pupil (e.g., 282). Optical splitter 250 expands the eyebox 280 of WHUD 200 by breaking up (or "splitting") the total scan range θ of SLP 220 into N=3 sub-ranges $\varphi_i$ and, correspondingly, replicating or repeating a single exit pupil (e.g., 282) as N=3 exit pupils 281, 282, and 283 over a larger spatial area at eye 290. As will be discussed in more detail later on, in order to replicate the same display content at each exit pupil 281, 282, and 283, SLP 220 may re-modulate nominally the same display content N times (e.g., repeated as N instances of nominally the same modulation pattern) in a sweep of the total scan range θ with each respective modulation (e.g., each one of the N instances) corresponding to a respective one of the N sub-ranges $\varphi_i$ of the total scan range θ. N=3 sub-ranges $\varphi_1$, $\varphi_2$, and $\varphi_3$ and N=3 exit pupils 281, 282, and 283 are used as illustrative examples only in FIG. 2A. A person of skill in the art will appreciate that in alternative implementations N may be any other integer greater than 1, such as N=2, 4, 5, 6, and so on.

Generally, a sweep of the total scan range θ by SLP 220 may include more (e.g., significantly more, such as on the order of tens more, hundreds more, thousands more, or even greater) than N light signals. Within such a sweep, the input side 251 of the polygonal structure in optical splitter 250 may be positioned and/or oriented to receive at least N light signals generated by SLP 220 and in-couple those light signals into the inner volume of optical splitter 250, and each respective one of the N=3 facets on the output side 252 of the polygonal structure in optical splitter 250 may be oriented to out-couple a respective portion of the at least N light signals from the volume of optical splitter 250 and redirect (e.g., refract) that respective portion of the at least N light signals towards holographic combiner 230 effectively from a respective one of the N=3 spatially-separated virtual positions for SLP 220. In this case, each one of the N light signals is in a respective one of the N sub-ranges $\varphi_i$ of the total scan range θ. That is, a first one of the N light signals is in a first one of the N sub-ranges $\varphi_1$ (e.g., one of light signals 271) and is redirected by optical splitter 250 to effectively originate from first virtual position 261 for SLP 220, a second one of the N light signals is in a second one of the N sub-ranges $\varphi_2$ (e.g., one of light signals 272) and is redirected by optical splitter 250 to effectively originate from second virtual position 262 for SLP 220, and a third one of the N light signals is in a third one of the N sub-ranges $\varphi_3$ (e.g., one of light signals 273) and is redirected by optical splitter 250 to effectively originate from third virtual position 263 for SLP 220, and so on as appropriate to the specific implementation (e.g., for all N). The particular virtual position 261, 262, and 263 for SLP 220 from which each one of the N light signals is redirected by optical splitter 250 depends on (e.g., is determined by) the particular point of incidence at which each light signal is received by optical splitter 250 and/or the particular one of the N facets on the output side 252 of optical splitter 250 through which each light signal is out-coupled from the volume of optical splitter 250. Holographic combiner 230 receives the N light signals from optical splitter 250 and converges each one of the N light signals to a respective spatially-separated exit pupil 281, 282, and 283 at or proximate eye 290. In this example, the N light signals may include, for example, N different instances of a same image (i.e., N repeated or replicated instances of the same image comprising at least two pixels) or the N light signals may include, for example, N different instances of a same pixel of an image (e.g., N repeated or replicated instances of the same pixel in the same image).

FIG. 2A depicts an illustrative example of a sweep of the total scan range (e.g., the total two-dimensional scan range, with only one dimension visible in the view of FIG. 2A) θ by SLP 220. As described previously, FIGS. 2B, 2C, and 2D respectively depict successive ones of the N=3 sub-ranges $\varphi_1$, $\varphi_2$, and $\varphi_3$ that make up the sweep of the total scan range θ of SLP 220 from FIG. 2A.

FIG. 2B is an illustrative diagram of WHUD 200 from FIG. 2A showing a sweep of a first sub-range $\varphi_1$ of the total scan range θ by SLP 220 (e.g., a partial sweep of the total scan range θ) and the corresponding redirection (e.g., refraction) of light signals 271 from first virtual position 261 by optical splitter 250 in accordance with the present systems, devices, and methods. In the illustrated example, first sub-range $\varphi_1$ corresponds to the light signals 271 (represented by lines with large dashes in both FIG. 2B and FIG. 2A) generated by SLP 220 over the first third of the total scan range θ, therefore $\varphi_1=\theta/3$. For the range of directions and/or angles of light signals 271 in first sub-range $\varphi_1$, optical splitter 250 receives light signals 271 at various points of incidence over a first range of points of incidence on the input side 251 of the polygonal structure in optical splitter 250. Based at least in part on the positions/locations of the points of incidence in the first range of points of incidence and/or the angle(s) of incidence of light signals 272 at input side 251 of optical splitter 250, light signals 271 couple through the volume of optical splitter 250 and out-couple from optical splitter 250 through first facet 252a on the output side 252 of optical splitter 250. First facet 252a is oriented to refract light signals 271 when light signals 271 out-couple therethrough, where the refraction redirects light signals 271 towards holographic combiner 230 effectively from first virtual position 261 for SLP 220. Holographic combiner 230 receives light signals 271 in first sub-range $\varphi_1$ from optical splitter 250 and converges light signals 271 to first exit pupil 281 at or proximate eye 290.

FIG. 2C is an illustrative diagram of WHUD 200 from FIGS. 2A and 2B showing a sweep of a second sub-range $\varphi_2$ of the total scan range θ by SLP 220 (e.g., a partial sweep of the total scan range θ) and the corresponding redirection (e.g., refraction) of light signals 272 from second virtual position 262 by optical splitter 250 in accordance with the present systems, devices, and methods. In the illustrated example, second sub-range $\varphi_2$ corresponds to the light signals 272 (represented by solid lines in both FIG. 2C and FIG. 2A) generated by SLP 220 over the second third of the total scan range θ, therefore $\varphi_2=\theta/3$. For the range of directions and/or angles of light signals 272 in second sub-range $\varphi_2$, optical splitter 250 receives light signals 272 at various points of incidence over a second range of points of incidence on the input side 251 of the polygonal structure in optical splitter 250. Based at least in part on the positions/locations of the points of incidence in the second range of points of incidence and/or the angle(s) of incidence of light signals 272 at input side 251 of optical splitter 250, light signals 272 couple through the volume of optical splitter 250 and out-couple from optical splitter 250 through second facet 252b on the output side 252 of optical splitter 250. Second facet 252b is oriented to refract light signals 272 when light signals 272 out-couple therethrough, where the refraction redirects light signals 272 towards holographic combiner 230 effectively from second virtual position 262 for SLP 220. Holographic combiner 230 receives light signals 272 in second sub-range $\varphi_2$ from optical splitter 250 and converges light signals 272 to second exit pupil 282 at or proximate eye 290. Because second virtual position 262 is spatially-separated from first virtual position 261, second exit pupil 282 is spatially-separated from first exit pupil 281 at or proximate eye 290.

FIG. 2D is an illustrative diagram of WHUD 200 from FIGS. 2A 2B, and 2C showing a sweep of a third sub-range $\varphi_3$ of the total scan range θ by SLP 220 (e.g., a partial sweep of the total scan range θ) and the corresponding redirection (e.g., refraction) of light signals 273 from third virtual position 263 by optical splitter 250 in accordance with the present systems, devices, and methods. In the illustrated example, third sub-range $\varphi_3$ corresponds to the light signals 273 (represented by dotted lines in both FIG. 2D and FIG. 2A) generated by SLP 220 over the last third of the total scan range θ, therefore $\varphi_3=\theta/3$. For the range of directions and/or angles of light signals 273 in third sub-range $\varphi_3$, optical splitter 250 receives light signals 273 at various points of incidence over a third range of points of incidence on the input side 251 of the polygonal structure in optical splitter 250. Based at least in part on the positions/locations of the points of incidence in the third range of points of incidence and/or the angle(s) of incidence of light signals 272 at input side 251 of optical splitter 250, light signals 273 couple through the volume of optical splitter 250 and out-couple from optical splitter 250 through third facet 252c on the output side 252 of optical splitter 250. Third facet 252c is oriented to refract light signals 273 when light signals 273 out-couple therethrough, where the refraction redirects light signals 273 towards holographic combiner 230 effectively from third virtual position 263 for SLP 220. Holographic combiner 230 receives light signals 273 in third sub-range $\varphi_3$ from optical splitter 250 and converges light signals 273 to third exit pupil 283 at or proximate eye 290. Because third virtual position 263 is spatially-separated from both first virtual position 261 and second virtual position 262, third exit pupil 283 is spatially-separated from both first exit pupil 281 and second exit pupil 282 at or proximate eye 290.

Throughout this specification and the appended claims, reference is often made to "points of incidence" of one or more light signal(s) at an optical splitter. Unless the specific context requires otherwise, a "point of incidence" at an optical splitter generally refers to the position or location on (e.g., at an outer surface of) or in (e.g., within an inner volume of) the optical splitter at which a light signal impinges on and/or first interacts with and/or is first influenced by the optical splitter. For example, an optical splitter as described herein may include a polygonal structure having an input side, and the "point of incidence" of a light signal at the optical splitter may refer to the position or location (e.g., the spatial "point") at which the light signal first impinges on the input side of the polygonal structure. The term "point" is used loosely in this context to refer to a general region having a particular spatial position and/or location and may include some dimensional attribute(s) (e.g., a finite length, area, or volume) depending on the spot size and spot geometry of the light signal at the point of incidence. In other words, the term "point" in this context is not intended to be limited to the mathematical notion of a dimensionless point in space.

In the illustrated examples of FIGS. 2B, 2C, and 2D, each of sub-ranges $\varphi_1$, $\varphi_2$, and $\varphi_3$ corresponds to a respective equal portion (e.g., a respective third) of total scan range θ. Optical splitter 250 (e.g., the N=3 facets on output side 252 of optical splitter 250) separates or "splits" light signals 270 from the sweep of the total scan range θ by SLP 220 into N=3 equal-sized sub-ranges: light signals 271 (FIG. 2B) corresponding to first sub-range $\varphi_1$=θ/3 and first facet 252$a$, light signals 272 (FIG. 2C) corresponding to second sub-range $\varphi_2$=θ/3 and second facet 252$b$, and light signals 273 (FIG. 2D) corresponding to third sub-range $\varphi_3$=θ/3 and third facet 252$c$. That is, for a first range of points of incidence at optical splitter 250 corresponding to all directions and/or angles of light signals 271 projected by SLP 220 in first sub-range $\varphi_1$=θ/3 of the total scan range θ, at least first facet 252$a$ of optical splitter 250 receives light signals 271 and redirects (either on its own or in combination with other optical elements) light signals 271 towards holographic combiner 230 effectively from first virtual position 261 for SLP 220; for a second range of points of incidence at optical splitter 250 corresponding to all directions and/or angles of light signals 272 projected by SLP 220 in second sub-range $\varphi_2$=θ/3 of the total scan range θ, at least second facet 252$b$ of optical splitter 250 receives light signals 272 and redirects (either on its own or in combination with other optical elements) light signals 272 towards holographic combiner 230 effectively from second virtual position 262 for SLP 220; and for a third range of points of incidence at optical splitter 250 corresponding to all directions and/or angles of light signals 273 projected by SLP 220 in third sub-range $\varphi_3$=θ/3 of the total scan range θ, at least third facet 252$c$ of optical splitter 250 receives light signals 273 and redirects (either on its own or in combination with other optical elements) light signals 273 towards holographic combiner 230 effectively from third virtual position 263 for SLP 220. Each of the N=3 sub-ranges (Pi, $\varphi_2$, and $\varphi_3$ in WHUD 200 corresponds to a respective equal portion (e.g., a respective third) of total scan range θ for illustrative purposes only. A person of skill in the art will appreciate that in alternative implementations, an optical splitter (and/or in alternative implementations of a WHUD employing an optical splitter) may include any number of facets (i.e., N may be any integer greater than 1) and the different facets may or may not be different sizes. At least two facets may be the same size (e.g., same area) and/or at least two facets may be different respective sizes (i.e., having different respective shapes, geometries, and/or areas). Similarly, SLP 220 may be operated to provide any number N of sub-ranges $\varphi_i$ and the sub-ranges $\varphi_i$ may or may not be equally-sized. At least two sub-ranges $\varphi_i$ may be the same size and/or at least two sub-ranges $\varphi_i$ may be different respective sizes. For example, if desired an optical splitter with N=3 facets may split light signals into three sub-ranges $\varphi_1$, $\varphi_2$, and $\varphi_3$ of sizes $\varphi_1$=θ/6, $\varphi_2$=2(θ/3), and $\varphi_3$=θ/6.

As previously described, over each sub-range $\varphi_i$ SLP 220 may re-modulate nominally the same pattern or arrangement of light signals. An example of such is now described.

Over a sweep of the total scan range θ by SLP 220, SLP 220 may produce light signals 270. Light signals 270 may comprise first light signals 271, second light signals 272, and third light signals 273.

Over first sub-range $\varphi_1$ of total scan range θ, SLP 220 may generate first light signals 271 and first light signals 271 may represent or embody a first set of pixels corresponding to a first image or a first portion of an image. First light signals 271 are redirected (e.g., refracted) by at least first facet 252$a$ of optical splitter 250 towards holographic combiner 230 along optical paths that trace back to effectively originate from first virtual position 261 for SLP 220. Holographic combiner 230 receives first light signals 271 and converges first light signals 271 to first exit pupil 281 at eye 290.

Over second sub-range $\varphi_2$ of total scan range θ, SLP 220 may generate second light signals 272 and second light signals 272 may represent or embody nominally the same first set of pixels as first light signals 271 corresponding to the same first image or the same first portion of an image. Second light signals 272 are redirected (e.g., refracted) by at least second facet 252$b$ of optical splitter 250 towards holographic combiner 230 along optical paths that trace back to effectively originate from second virtual position 262 for SLP 220. Holographic combiner 230 receives second light signals 272 and converges second light signals 272 to second exit pupil 282 at eye 290. Because first light signals 271 and second light signals 272 represent or embody nominally the same display content, first exit pupil 281 and second exit pupil 282 each provides a respective instance (e.g., a respective replicated or repeated instance) of the same display content to a different respective position at or proximate eye 290. In this way, eye 290 is able to see the same content regardless of which at least one of first exit pupil 281 and/or second exit pupil 282 aligns with the gaze direction (e.g., pupil position) of eye 290. Rather than comprising a single exit pupil at one location, eyebox 280 of WHUD 200 is expanded to comprise spatially-separated first and second exit pupils 281 and 282.

Over third sub-range $\varphi_3$ of total scan range θ, SLP 220 may generate third light signals 273 and third light signals 273 may represent or embody nominally the same first set of pixels as first light signals 271 and second light signals 272 corresponding to the same first image or the same first portion of an image. Third light signals 273 are redirected (e.g., refracted) by at least third facet 252$c$ of optical splitter 250 towards holographic combiner 230 along optical paths that trace back to effectively originate from third virtual position 263 for SLP 220. Holographic combiner 230 receives third light signals 273 and converges third light signals 273 to third exit pupil 283 at eye 290. Because third light signals 273 represent or embody nominally the same display content as first light signals 271 and second light signals 272, third exit pupil 283 provides another instance (e.g., another replicated or repeated instance) of the same display content as that provided by first exit pupil 281 and second exit pupil 282 to another position at or proximate eye 290. In this way, eye 290 is able to see the same content regardless of which at least one of first exit pupil 281, second exit pupil 282, and/or third exit pupil 283 aligns with the gaze direction (e.g., pupil position) of eye 290. Eyebox 280 of WHUD 200 is expanded to comprise spatially-separated first, second, and third exit pupils 281, 282, and 283. As previously described, expansion of eyebox 280 to include three exit pupils 281, 282, and 283 in WHUD 200 is used for illustrative purposes only. The present systems, devices, and methods may be extended to expand the eyebox of a WHUD to include any number N of exit pupils depending on the requirements of the specific application by, for example, expanding an optical splitter to include any number N of facets on the output side thereof.

Throughout this specification, the expression "nominally the same" is generally used in reference to certain light signals (e.g., first light signals 271 being nominally the same as second light signals 272) to indicate that those particular light signals are defined to represent the same content when viewed by the user. For example, first light signals 271 and second light signals 272 are "nominally the same" when first light signals 271 and second light signals 272 are both defined by SLP 220 to represent the same image, or the same portion of an image, or generally the same display content. The term "nominally" in "nominally the same" is meant to reflect the fact that, in some situations, even though two light signals (e.g., two sets of light signals, as with first light signals 271 and second light signals 272) may both be defined to represent the same display content the two light signals (or sets of light signals) may not be identical sets of light signals. Such a situation can arise, for example, when the two light signals (e.g., the two sets of light signals) are each exposed to different respective optical distortions.

In the various implementations described herein, multiple (i.e., N) instances of an image are effectively projected from respective ones of multiple (i.e., N) different virtual positions. Each one of the N virtual positions corresponds to a respective range of optical paths through the optical splitter and effectively "projects" light signals towards or on the holographic combiner over a respective range of optical paths comprising a respective range of directions and/or angles. As a consequence, each one of the N virtual positions may effectively "project" light signals with a different respective optical distortion profile. For example, a first set of light signals (e.g., representing a first instance of an image) effectively originating from a first virtual position may be subject to a first set of optical distortions (e.g., image skewing, keystoning, aberrations, and so on) resulting from the particular set of optical paths the first set of light signals follows through the optical splitter, from the optical splitter to the holographic combiner, and/or from the holographic combiner to the first exit pupil. Likewise, a second set of light signals (e.g., representing a second instance of the same image) effectively originating from a second virtual position may be subject to a second set of optical distortions (e.g., image skewing, keystoning, aberrations, and so on) resulting from the particular set of optical paths the second set of light signals follows through the optical splitter, from the optical splitter to the holographic combiner, and/or from the holographic combiner to the second exit pupil. The first set of optical distortions and the second set of optical distortions may not be identical. In order to correct for optical distortions, the SLP may be calibrated to apply various offsets, compensations, corrections, or other measures to projected light signals so that the light signals account for the optical distortions and will appear correctly at the eye of the user. Since the first set of optical distortions and the second set of optical distortions may not be identical to one another, the SLP may be calibrated to apply a first image correction profile (e.g., a first set of image correction measures) to the first set of light signals (e.g., representing the first instance of the image) and a second image correction profile (e.g., a second set of image correction measures) to the second set of light signals (e.g., representing the second instance of the same image). Therefore, even though the first set of light signals and the second set of light signals may each be defined by the SLP to represent the same display content, the first set of light signals and the second set of light signals may not be identical to one another. In this example, the first set of light signals and the second set of light signals are not the same but they are said to be "nominally the same" because they are each defined by the SLP to represent the same display content.

Returning to FIG. 2A, FIG. 2A depicts the cumulative effect of a sweep through successive ranges of the first sub-range $\varphi_1$ from FIG. 2B, the second sub-range $\varphi_2$ from FIG. 2C, and the third sub-range $\varphi_3$ from FIG. 2D to produce three exit pupils 281, 282, and 283, respectively, at eye 290 during a sweep of the total scan range $\theta$ by SLP 220 in accordance with the present systems, devices, and method. In other words, FIG. 2A simultaneously depicts each one of the three ranges of time shown in FIGS. 2B, 2C, and 2D all overlaid into one illustration. Eyebox 280 comprises three exit pupils 281, 282, and 283 and each of the three exit pupils 281, 282, and 283 provides a respective temporally-separated copy or instance of the same display content to eye 290 over a different range of time. For example, first exit pupil 281 may provide a first instance of a first image to eye 290 over the range of time during which SLP 220 sweeps through first sub-range $\varphi_1$ (e.g., over the range of time during which SLP 220 sweeps through the first ⅓ of the total scan range $\theta$), second exit pupil 282 may provide a second instance of the first image to eye 290 over the range of time during which SLP 220 sweeps through second sub-range $\varphi_2$ (e.g., over the range of time during which SLP 220 sweeps through the second ⅓ of the total scan range $\theta$), and third exit pupil 283 may provide a third instance of the first image to eye 290 over the range of time during which SLP 220 sweeps through third sub-range $\varphi_3$ (e.g., over the range of time during which SLP 220 sweeps through the third ⅓ of the total scan range $\theta$). Thus, the three instances of the first image provided by respective ones of the three exit pupils 281, 282, and 283 may be projected temporally in series (i.e., serially) with one another. In order that the user does not see three sequential projections of the same display content, SLP 220 may re-modulate the three respective instances of the same display content at a rate that is too fast to be discerned by eye 290. The cumulative effect (i.e., the concurrence of exit pupils 281, 282, and 283) depicted in FIG. 2A may represent what is actually perceived by the user when, as depicted sequentially in FIGS. 2B, 2C, and 2D, SLP 220 quickly (e.g., at about 60 Hz) remodulates N sequential instances of the same display content over a sweep of the total scan range $\theta$ and optical splitter 250 splits the sweep of the total scan range $\theta$ into respective ones of N sub-ranges $\varphi_i$ with each sub-range $\varphi_i$ corresponding to a respective one of the N sequential instances of the display content.

In accordance with the present systems, devices, and methods, SLP 220 and optical splitter 250 together separate or "split" the light signals 270 projected by SLP 220 over the total scan range $\theta$ into N=3 sub-ranges $\varphi_1$, $\varphi_2$, and $\varphi_3$ to produce N=3 instances 271, 272, and 273 of the same display content. Because each of these N=3 instances follows a different respective range of optical paths effectively originating from a different respective spatially-separated virtual position 261, 262, and 263 for SLP 220, holographic combiner 230 converges each of these N=3 instances to a respective spatially-separated exit pupil 281, 282, and 283 at or proximate eye 290. Spatially-separated exit pupils 281, 282, and 283 are distributed over an area of eye 290 that covers a wider range of pupil positions (e.g., gaze directions) than a single exit pupil (of the same size as any one of exit pupils 281, 282, and 283) on its own. Thus, eyebox 280 is expanded by exit pupil replication in WHUD 200.

In the illustrated example, each of the N=3 virtual positions 261, 262, and 263 for SLP 220 effectively created or established by optical splitter 250 is different (i.e., spatially-separated) from real position 260. However, in some implementations optical splitter 250 may include a configuration or arrangement of one or more optical element(s) or optical device(s) for which a sub-range $\varphi_i$ of light signals 270 is directed to holographic combiner 230 effectively from real position 260 rather than from a virtual position.

In FIG. 2A, light signals 271 effectively originating from first virtual position 261, light signals 272 effectively originating from second virtual position 262, and light signals 273 effectively originating from third virtual position 263, are all shown incident at or on about the same region of holographic combiner 230. This configuration is exemplary and in practice alternative configurations may be preferred depending on the specific implementation. Generally, each sub-range $\varphi_i$ of light signals (e.g., each of light signals 271, light signals 272, and light signals 273) may be incident upon (and received by) a respective region or area of holographic combiner 230 and these respective areas of holographic combiner 230 may or may not completely overlap (e.g., such areas may partially overlap or correspond to separate, non-overlapping areas).

In a virtual retina display such as scanning laser-based WHUD 100 and/or scanning laser-based WHUD 200, there may not be an "image" formed outside of the eye of the user. There is typically no microdisplay or projection screen or other place where the projected image is visible to a third party; rather, the image may be formed completely within the eye of the user. For this reason, it may be advantageous for a scanning laser-based WHUD to be designed to accommodate the manner in which the eye forms an image.

For a light signal entering the eye (e.g., a light ray, a wavefront, an incident beam from a SLP, or similar), the eye (or more accurately, the combination of the eye and the human brain) may determine "where" the light signal is positioned in the user's field of view based on the region of the retina that is illuminated by the light signal. Two light signals that illuminate the same region of the retina may appear in the same position in the user's field of view. The particular region of the retina that is illuminated by any given light signal is determined by the angle and not the location at which the light signal enters the eye. Thus, two light signals may appear in the same position in the user's field of view even if they enter different location of the user's pupil provided that the two light signals have the same angle of incidence when they enter the user's eye. The geometry of the eye's lens is such that any two light signals entering the eye at the same angle, regardless of the position/location at which the light signals enter the eye, may generally be directed to the same region of the retina and so may generally appear in the same position in the user's field of view.

In at least some implementations, the scanning laser-based WHUDs described herein project multiple instances of the same image onto the retina of the eye in rapid succession. Even if the multiple instances are temporally-separated, the temporal separation may be small enough to be undetectable by the user. If any two of the multiple instances of the same image do not align/overlap on the eye's retina then those two instances of the image may not align/overlap in the user's field of view and undesirable effects such as ghosting can occur. In order to ensure that multiple instances of the same image (each corresponding to a respective exit pupil) align/overlap on the retina so that multiple instances of the image align/overlap in the user's field of view, a scanning laser-based WHUD may advantageously be configured to direct multiple instances of any given light signal (each corresponding to a respective exit pupil and each representing a respective instance of the same display content) towards the eye spatially in parallel with one another. More specifically and referring to FIG. 2A, the optical splitter 250 (such as the number, geometry, and orientation of the facets thereof) and/or the holographic combiner 230 may be configured, arranged and/or operated (either individually or in combination) so that the holographic combiner 230 redirects the N=3 sets of light signals 271, 272, and 273, respectively, all spatially in parallel with one another towards respective regions (i.e., towards respective ones of N=3 spatially-separated exit pupils 281, 282, and 283) of the eye 290 of the user.

Figure 2E:
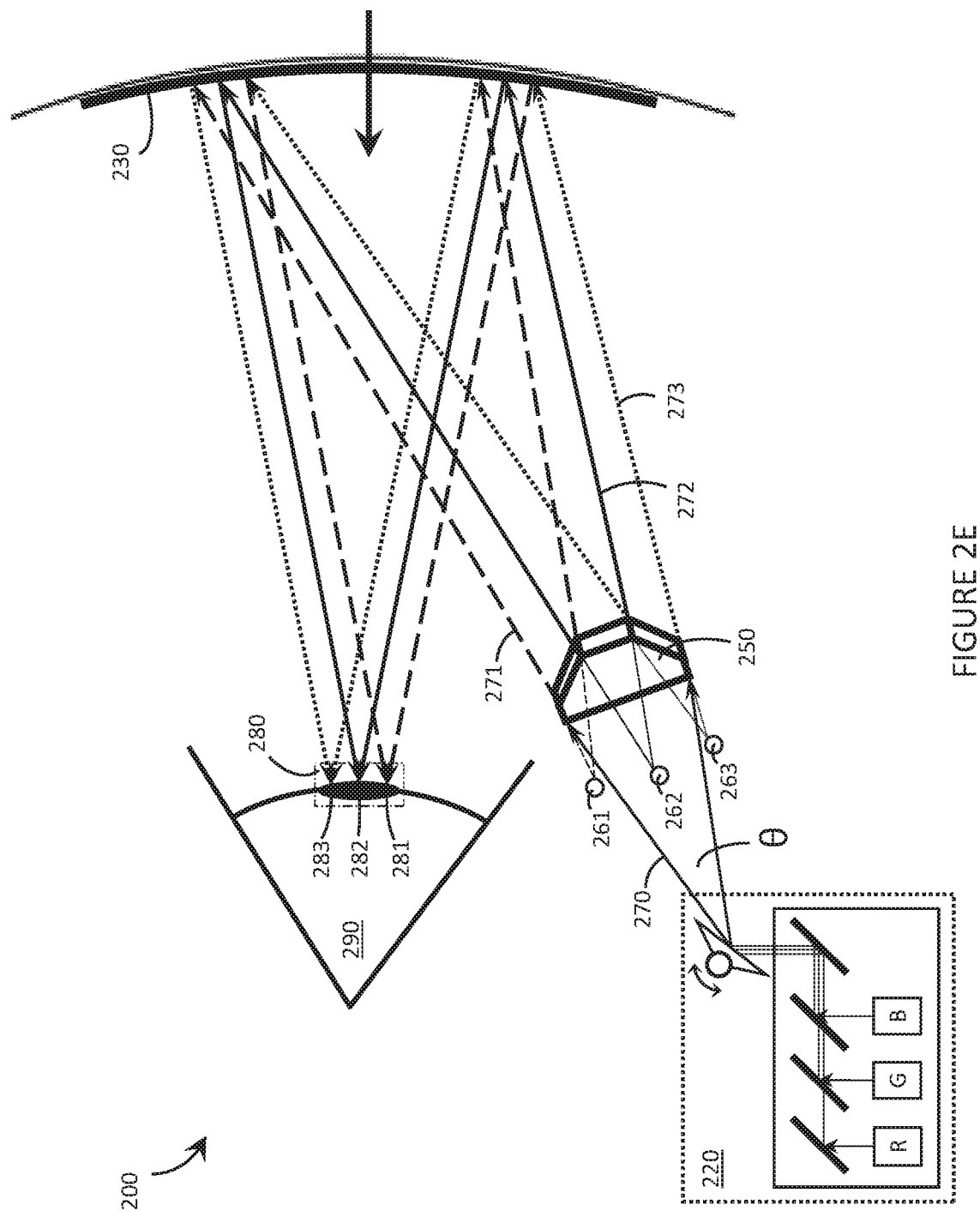
FIG. 2E is an illustrative diagram of the wearable heads-up display from FIGS. 2A, 2B, 2C, and 2D showing eyebox expansion by temporally sequential exit pupil replication with respective instances of the same display content projected spatially in parallel with one another towards respective exit pupils in accordance with the present systems, devices, and methods.

FIG. 2E is an illustrative diagram of WHUD 200 from FIGS. 2A, 2B, 2C, and 2D showing eyebox expansion by temporally sequential exit pupil replication with respective instances of the same display content (e.g., pixel(s)) projected spatially in parallel with one another towards respective exit pupils in accordance with the present systems, devices, and methods. In order to highlight some of the features shown in the implementation of FIG. 2E, the corresponding aspects of FIG. 2A will first be noted.

In the implementation of FIG. 2A, light signals 271 effectively originating from first virtual position 261, light signals 272 effectively originating from second virtual position 262, and light signals 273 effectively originating from third virtual position 263, all align with one another and completely overlap on holographic combiner 230. As a result, each of the N=3 exit pupils 281, 282, and 283 converges at or proximate eye 290 from substantially the same area of holographic combiner 230. Because each of the N=3 exit pupils 281, 282, and 283 originates from substantially the same area of holographic combiner 230 but converges to a respective spatially-separated region of eye 290, each of the N=3 exit pupils 281, 282, and 283 necessarily includes at least some light signals having incident angles (at eye 290), or reflection angles (at holographic combiner 230), that cannot be provided by at least one other one of the N=3 exit pupils 281, 282, and 283. For example, light signals 271 (represented by lines with large dashes) that converge to exit pupil 281 include at least some angles of incidence (at eye 290, or angles of reflection at holographic combiner 230) that are not included in light signals 272 (represented by solid lines) that converge to exit pupil 282, and vice versa. As previously described, the angle of incidence of a light signal as it enters the eye determines where in the user's field of view the light (or the pixel of an image embodied by the light signal) will appear. A light signal having an angle of incidence that is unique to one exit pupil can only be projected to a user when that exit pupil aligns with the user's pupil (e.g., when the user's gaze direction includes that exit pupil). Thus, when multiple spatially-separated exit pupils all originate from substantially the same spatial area on holographic combiner 230, only a limited sub-region of that spatial area may be used to provide angles of incidence that are common to all of the exit pupils and, consequently, only a respective limited fraction of the available field of view and/or resolution of each spatially-separated exit pupil may be used to provide uniform image replication across all of the exit pupils. Having light signals 271 effectively originating from first virtual position 261, light signals 272 effectively originating from second virtual position 262, and light signals 273 effectively originating from third virtual position 263, all align and overlap on holographic combiner 230 can simplify some aspects of the design of optical splitter 250 and/or holographic combiner 230 but can also limit the available resolution and/or field of view of display content that can be replicated across all exit pupils.

In the implementation of FIG. 2E, optical splitter 250 is modified (e.g., the facets thereof are modified in geometry, orientation, and/or composition) to shift the relative trajectories of light signals 271, 272, and 273 compared to their corresponding trajectories in the implementation of FIG. 2A. Light signals 271 effectively originating from first virtual position 261, light signals 272 effectively originating from second virtual position 262, and light signals 273 effectively originating from third virtual position 263, do not align or completely overlap on holographic combiner 230 in FIG. 2E as they do in FIG. 2A. Instead, light signals 271, light signals 272, and light signals 273 are spatially distributed over the area of holographic combiner 230 and each positioned (at incidence on holographic combiner 230) so that they are all substantially spatially parallel to one another when redirected (e.g., reflected) and converged by holographic combiner 230 towards respective ones of the N=3 spatially-separated exit pupils 281, 282, and 283 at or proximate eye 290. That is, light signals 271 that are converged by holographic combiner 230 to exit pupil 281, light signals 272 that are converged by holographic combiner 230 to exit pupil 282, and light signals 273 that are converged by holographic combiner 230 to exit pupil 283, all include the same angles of reflection from holographic combiner 230 and accordingly the same angles of incidence with respect to eye 290. In contrast to the implementation of FIG. 2A, in the implementation of FIG. 2E none of the N=3 exit pupils 281, 282, and 283 includes a light signal having an angle of incidence (with respect to eye 290, or an angle of reflection with respect to holographic combiner 230) that is not also included in each of the other ones of the N=3 exit pupils 281, 282, and 283. Each of the N=3 exit pupils 281, 282, and 283 of the implementation in FIG. 2E includes the entire field of view and/or resolution available thereto and therefore the implementation of WHUD 200 depicted in FIG. 2E can provide uniform image replication across multiple exit pupils (e.g., multiple temporally-separated and spatially-separated exit pupils) with larger field of view and/or with higher resolution than the implementation of WHUD 200 depicted in FIG. 2A, at the cost of added complexity in optical splitter 250 and/or holographic combiner 230.

As previously described, holographic combiner 230 comprises at least one hologram embedded in, encoded in, recorded in, or otherwise carried by at least one layer of holographic film. The holographic film may include, as examples, a photopolymer film such as Bayfol®HX from Bayer MaterialScience AG or a silver halide compound. The nature of the at least one hologram may depend on the specific implementation.

As a first example, holographic combiner 230 may include a single hologram that effectively operates as a fast-converging (e.g., convergence within about 1 cm, convergence within about 2 cm, or convergence within about 3 cm) mirror for light having the wavelength(s) provided by SLP 220. In this first example, the holographic film that carries the first hologram may have a relatively wide bandwidth, meaning the hologram recorded in the holographic film may impart substantially the same optical effect or function on all light signals 270 projected by SLP 220 over a relatively wide range of angles of incidence at holographic combiner 230. For the purpose of the present systems, devices, and methods, the term "wide bandwidth" in relation to holograms and holographic films means an angular bandwidth that is greater than or equal to the total range of angles of incidence of all light signals received by any given point, region, or location of the hologram or holographic film from an optical splitter (e.g., from a particular facet of an optical splitter). As an example, WHUD 200 may implement a wide bandwidth hologram in holographic combiner 230 having an angular bandwidth of greater than or equal to about 8°. In this case, the spatial separation between virtual positions 261, 262, and 263 may be such that any given point, region, or location of holographic combiner 230 receives light signals (i.e., included in any of light signals 271, 272, and 273) spanning an 8° (or less) range of angles of incidence at holographic combiner 230.

Consistent with conventional mirror behavior, for a single wide-bandwidth fast-converging hologram carried by holographic combiner 230 the angles of incidence for a range of light signals incident on holographic combiner 230 may influence the angles of reflection for that range of light signals redirected by holographic combiner 230. Since holographic combiner 230 is, generally during normal operation of WHUD 200, fixed in place relative to SLP 220, the angles of incidence for a range of light signals are determined, at least in part, by the particular virtual position 261, 262, or 263 for the SLP 220 from which optical splitter 250 causes the range of light signals to effectively originate. The spatial position of the exit pupil 281, 282, or 283 to which the range of light signals is converged by holographic combiner 230 is then determined, at least in part, by the angles of reflection of that range of light signals from holographic combiner 230. Each one of virtual positions 261, 262, and 263 provides light signals over a respective range of angles of incidence (generally but not necessarily with at least some overlap) at holographic combiner 230 and therefore holographic combiner 230 converges light signals from each one of virtual positions 261, 262, and 263 to a respective one of exit pupils 281, 282, and 283. This is why, referring to FIG. 2A for example, light signals 271 that effectively originate from virtual position 261 (represented by lines with large dashes) with a range of relatively small angles of incidence (compared to light signals 272 and 273 that effectively originate from virtual positions 262 and 263, respectively) map to exit pupil 281 with a range of relatively small angles of reflection (compared to the other exit pupils 282 and 283) and light signals 273 that effectively originate from virtual position 263 (represented by dotted lines) with a range of relatively large angles of incidence (compared to light signals 271 and 272 that effectively originate from virtual positions 261 and 262, respectively) map to exit pupil 283 with a range of relatively large angles of reflection (compared to the other exit pupils 281 and 282).

As a second example, rather than a single hologram, holographic combiner 230 may instead include any number of multiplexed holograms. Multiplexed holograms may be advantageous when, for example, multiple wavelengths of light signals are used (e.g., red, green, and blue light signals generated by SLP 220) and/or to provide a further means to separate light signals effectively originating from different virtual positions for SLP 220. The "single hologram" example described above may be suitable for an implementation in which SLP 220 only provides light signals of a single wavelength (e.g., only red light signals, only green light signals, or only blue light signals), but for implementations in which SLP 220 provides light signals of multiple wavelengths it may be advantageous for holographic combiner 230 to include a respective wavelength multiplexed hologram for each respective wavelength of light signals provided by SLP 220 (e.g., each respective nominal wavelength of light signals provided by SLP 220, since a laser diode may generally provide light signals over a narrow waveband). Thus, when SLP 220 includes three different laser diodes each providing light signals of a respective nominal wavelength (e.g., a red laser diode, a green laser diode, and a blue laser diode) it may be advantageous for holographic combiner 230 to include three wavelength-multiplexed holograms (e.g., a red hologram, a green hologram, and a blue hologram) each designed to work (e.g., "playback") for light signals having a respective one of the three nominal wavelengths. In this example, at least one "red hologram" (i.e., at least one hologram that is designed to playback for light signals having a wavelength that corresponds to red light) may converge a respective red component of each of light signals 271, 272, and 273 to a respective one of the N=3 exit pupils 281, 282, and 283, at least one "green hologram" (i.e., at least one hologram that is designed to playback for light signals having a wavelength that corresponds to green light) may converge a respective green component of each of light signals 271, 272, and 273 to a respective one of the N=3 exit pupils 281, 282, and 283, and at least one blue hologram (i.e., at least one hologram that is designed to playback for light signals having a wavelength that corresponds to blue light) may converge a respective blue component of each of light signals 271, 272, and 273 to a respective one of the N=3 exit pupils 281, 282, and 283. In other words, for a light signal redirected from a particular one of the N spatially-separated virtual positions for the SLP by the optical splitter (e.g., by a particular one of the N facets of the optical splitter), the at least one red hologram may converge a red component of the light signal to a particular one of the N exit pupils at or proximate the eye of the user, the at least one green hologram may converge a green component of the light signal to the particular one of the N exit pupils at or proximate the eye of the user, and the at least one blue hologram may converge a blue component of the light signal to the particular one of the N exit pupils at or proximate the eye of the user.

As a third example, either apart from or in addition to multiple wavelength-multiplexed holograms, holographic combiner 230 may include at least N angle-multiplexed holograms. That is, for an implementation with N=3 virtual positions 261, 262 and 263 for the SLP 220 and N=3 exit pupils 281, 282, and 283, holographic combiner 230 may include at least N=3 angle-multiplexed holograms (or N=3 sets of angle-multiplexed holograms when wavelength multiplexing is also employed, as discussed later on). Each of the N=3 angle-multiplexed holograms may be designed to playback for light signals effectively originating from a respective one of the N=3 virtual positions 261, 262, and 263 for SLP 220 and converge such light signals to a respective one of the N=3 exit pupils 281, 282, and 283. That is, a first angle-multiplexed hologram may be designed to playback for light signals 271 effectively originating from virtual position 261 for SLP 220 and converge light signals 271 to first exit pupil 281, a second angle-multiplexed hologram may be designed to playback for light signals 272 effectively originating from virtual position 262 for SLP 220 and converge light signals 272 to second exit pupil 282, and a third angle-multiplexed hologram may be designed to playback for light signals 273 effectively originating from virtual position 263 for SLP 220 and converge light signals 273 to third exit pupil 283.

For implementations that employ angle-multiplexing, it may be advantageous for the holographic film that includes an angle-multiplexed hologram to be of relatively narrow bandwidth. Particularly, it may be advantageous for the holographic film to have an angular bandwidth that is less than or about equal to the minimum difference between the respective angles of incidence of two light signals that are incident on the same point, region, or location of holographic combiner 230 but effectively originate from different virtual positions 261, 262, and 263. As an example, WHUD 200 may implement a narrow bandwidth angle-multiplexed hologram in holographic combiner 230 having an angular bandwidth of less than or equal to about 4°. In this case, the difference between the angle of incidence (at holographic combiner 230) of a light signal 271 that effectively originates from virtual position 261 and is incident at a first point on holographic combiner 230 and the angle of incidence (at holographic combiner 230) of a light signal 272 that effectively originates from virtual position 262 and is incident at the same first point on holographic combiner 230 may be less than or equal to about 4°. In this way, each respective angle-multiplexed hologram in holographic combiner 230 may be designed to substantially exclusively playback for a respective one of light signals 271, 272, or 273 effectively originating from a respective one of virtual positions 261, 262, or 263 for SLP 220 and to substantially not playback (e.g., insubstantially playback) for the other ones of light signals 271, 272, or 273 effectively originating from the other ones of virtual positions 261, 262, or 263 for SLP 220.

Generally, holographic combiner 230 may include at least N multiplexed holograms and each one of the at least N multiplexed holograms may converge light signals corresponding to a respective one of the N spatially-separated virtual positions for SLP 220 (e.g., corresponding to a respective one of the N facets of optical splitter 250) to a respective one of N exit pupils at or proximate the eye 290 of the user.

Some implementations may employ both wavelength multiplexing and angle multiplexing. For example, an implementation that employs angle multiplexing and light signals of multiple wavelengths (e.g., a multi-color SLP) may advantageously also employ wavelength multiplexing. In this case, holographic combiner 230 may include a wavelength-multiplexed and angle-multiplexed holographic combiner that includes at least N angle-multiplexed red holograms, at least N angle-multiplexed green holograms, and at least N angle-multiplexed blue holograms. Each one of the at least N angle-multiplexed red holograms may converge red components of light signals (e.g., 271) redirected from a respective one of the N spatially-separated virtual positions (e.g., 261) for SLP 220 by a respective one of the N facets of optical splitter 250 to a respective one of the N exit pupils (e.g., 281) at or proximate eye 290. Each one of the at least N angle-multiplexed green holograms may converge green components of light signals (e.g., 271) redirected from a respective one of the N spatially-separated virtual positions (e.g., 261) for SLP 220 by a respective one of the N facets of optical splitter 250 to a respective one of the N exit pupils (e.g., 281) at or proximate eye 290. Each one of the at least N angle-multiplexed blue holograms may converge blue components of light signals (e.g., 271) redirected from a respective one of the N spatially-separated virtual positions (e.g., 261) for SLP 220 by a respective one of the N facets of optical splitter 250 to a respective one of the N exit pupils (e.g., 281) at or proximate eye 290.

Implementations of holographic combiner 230 that employ multiple multiplexed holograms may include multiple holograms in or on a single layer (i.e., all in or on the same layer) of holographic film or may include multiple layers of holographic film with each layer of holographic film carrying at least one respective hologram. Holographic combiner 230 may or may not comprise at least one volumetric holographic optical element. Generally, holographic combiner 230 may comprise a single layer of holographic film that carries any number of holograms or holographic combiner 230 may comprise multiple layers of holographic film (e.g., multiple layers laminated together) with each respective layer of holographic film carrying any number of respective holograms.

Holographic combiner 230 may be substantially flat or planar in geometry or, as illustrated in FIGS. 2A, 2B, 2C, 2D, and 2E, holographic combiner 230 may embody some curvature. In some implementations, holographic combiner 230 may embody curvature because holographic combiner 230 is carried by a prescription eyeglass lens 240 that has some curvature. When necessary, holographic combiner 230 may include systems, devices, and/or methods for curved holographic optical elements described in U.S. Provisional Patent Application Ser. No. 62/268,892.

The various embodiments described herein provide systems, devices, and methods for optical splitter-based eyebox expansion by exit pupil replication in scanning laser-based WHUDs. Each replicated exit pupil is aligned to a respective spatially-separated position at or proximate the eye of the user because the optical splitter (i.e., the positions, orientations, and geometries of the faceted surfaces thereof) selectively routes (e.g., refracts) the light signals along spatially-separated optical paths that each trace back to (e.g., each appear to effectively originate from) a different spatially-separated virtual position for the SLP. The effect is substantially the same as if multiple SLPs were used instead of the optical splitter, with each SLP positioned in a respective one of the virtual positions and with each SLP projecting a respective instance of a light signal towards the holographic combiner; however, the use of the optical splitter has considerable advantages in terms of power savings and minimizing hardware bulk.

Optical splitter 250 separates or splits light signals 270 into light signals 271, 272, and 273 and redirects (e.g., refracts) light signals 271, 272, and 273 ultimately towards respective ones of exit pupils 281, 282, and 283 at eye 290. SLP 220 may be modulated to repeat nominally the same display content for each of light signals 271, 272, and 273. This redundancy enables WHUD 200 to rapidly display N=3 instances of the same image at N=3 different regions of eye 290 and thereby expand the eyebox 280 of the system to encompass all N=3 exit pupils 281, 282, and 283. However, in some applications or implementations, only one instance of an image may need to be (or want to be) displayed to eye 290 at any given time. Such can simplify the operation of SLP 220 and save the power required to produce multiple potentially redundant instances of the same image. In accordance with the present systems, devices, and methods, a WHUD 200 may include an eye tracker communicatively coupled to SLP 220 (either directly or by common communicative coupling to another element, such as a processor or non-transitory processor-readable storage medium) to determine the pupil position (e.g., gaze direction) of eye 290. Information about the pupil position (or gaze direction) of eye 290 may be used by SLP 220 to determine over which one(s) of the N sub-ranges $\varphi_i$ of the total scan range $\theta$ to modulate light signals in order to provide display content to the user. That is, based on information about the pupil position (or gaze direction) of eye 290, SLP 220 may optionally only generate light signals over the particular sub-range(s) $\varphi_i$ of the total scan range $\theta$ that correspond to the particular exit pupil(s) that align(s) with the current pupil position (or gaze direction) of eye 290. If the gaze direction of eye 290 (as determined by an eye tracker of WHUD 200) is such that the pupil of eye 290 only aligns with one exit pupil (e.g., with exit pupil 283), then SLP 220 may be modulated to only generate light signals during the $\varphi_3$ sub-range portion of the total scan range $\theta$ so that only light signals 273 are produced and the power associated with generating redundant light signals 271 and 272 may be saved.

An eye tracker included in any of the implementations of WHUDs described herein may employ any of a variety of different eye tracking technologies depending on the specific implementation. For example, an eye tracker may employ any or all of the systems, devices, and methods described in U.S. Provisional Patent Application Ser. No. 62/167,767; U.S. Provisional Patent Application Ser. No. 62/271,135; U.S. Provisional Patent Application Ser. No. 62/245,792; and/or U.S. Provisional Patent Application Ser. No. 62/281,041. As previously described, WHUD 200 may include at least one processor and at least one non-transitory processor-readable storage medium or memory communicatively coupled thereto. The at least one memory may store processor-executable data and/or instructions that, when executed by the at least one processor, cause the at least one processor to control the operation of either or both of SLP 220 and/or an eye tracker.

As described previously, optical splitter 250 includes a transparent polygonal structure that is positioned and/or oriented to receive (e.g., at an input side 251 thereof) light signals 270 corresponding to a sweep of the total two-dimensional scan range $\theta$ by SLP 220, separate the light signals into N two-dimensional sub-ranges $\varphi_i$ based on the point of incidence of each light signal 270 at optical splitter 250, where $\Sigma_{i=1}^{N}\varphi_i=\theta$, and redirect (e.g., through respective ones of N facets 252a, 252b, 252c at an output side 252 thereof) the light signals in each two-dimensional sub-range $\varphi_i$ towards holographic combiner 230 effectively from a respective one of N spatially-separated virtual positions 261, 262, and 263 for SLP 220. As also described previously, the total two-dimensional scan range $\theta$ of a SLP may be broken down into a total scan range $\Omega$ in a first dimension corresponding to all available directions and/or angles of light signals in a first dimension (e.g., the horizontal dimension) that the SLP is operative to output during normal use, and a total scan range $\Psi$ in a second dimension corresponding to all available directions and/or angles of light signals in a second dimension (e.g., the vertical dimension) that the SLP is operative to output during normal use. When the total two-dimensional scan range $\theta$ of SLP 220 includes a total scan range $\Omega$ in a first dimension, then the polygonal structure of optical splitter 250 may be engineered, positioned, and/or oriented to receive light signals corresponding to a sweep of the total scan range $\Omega$ in the first dimension by SLP 220, separate the light signals corresponding to the sweep of the total scan range $\Omega$ in the first dimension into X sub-ranges $\omega_i$ in the first dimension based on point of incidence at the input side 251 of optical splitter 250, where $1<X\leq N$ and $\Sigma_{i=1}^{X}\omega_i=\Omega$ and redirect the light signals corresponding to the sweep of the total scan range $\Omega$ in the first dimension towards holographic combiner 230 effectively from at least X of the N spatially-separated virtual positions for SLP 220. In this case, each one of the X sub-ranges $\omega_i$ may correspond to a different one of the N spatially-separated virtual positions for SLP 220 and a different one of N facets on the output side 252 of optical splitter 250. The particular virtual position for SLP 220 from which each light signal in the sweep of the total scan range $\Omega$ in the first dimension is redirected (e.g., refracted) by optical splitter 250 may depend on (e.g., may be determined by) the particular sub-range $\omega_i$ in the first dimension to which the light signal corresponds and/or the particular faceted surface on the output side 252 of optical splitter 250 through which the light signal is refracted. When holographic combiner 230 receives light signals corresponding to the sweep of the total scan range $\Omega$ in the first dimension, at least one hologram of holographic combiner 230 may converge the light signals to respective ones of at least X of the N exit pupils at or proximate eye 290. The particular exit pupil towards which a light signal in the sweep of the total scan range $\Omega$ in the first dimension is redirected by holographic combiner 230 may depend on (e.g., may be determined by) at least the particular sub-range $\omega_i$ in the first dimension into which the light signal is separated by optical splitter 250, which may depend on the particular faceted surface at the output side 252 of optical splitter 250 through which the light signal is refracted.

When the total two-dimensional scan range θ of SLP 220 further includes a total scan range Ψ in a second dimension, with for example θ=Ω×Ψ then the polygonal structure of optical splitter 250 may be engineered, positioned, and/or oriented to receive light signals corresponding to a sweep of the total scan range Ψ in the second dimension by SLP 220, separate the light signals corresponding to the sweep of the total scan range Ψ in the second dimension into Y sub-ranges $\beta_i$ in the second dimension based on point of incidence at the input side 251 of optical splitter 250, where 1<Y≤N and $\Sigma_{i=1}^{Y}\beta_i=\psi$ and redirect the light signals corresponding to the sweep of the total scan range Ψ in the second dimension towards holographic combiner 230 effectively from at least Y of the N spatially-separated virtual positions for SLP 220. In this case, each one of the Y sub-ranges $\beta_i$ may correspond to a different one of the N spatially-separated virtual positions for SLP 220 and a different one of N facets on the output side 252 of optical splitter 250. For at least one virtual position for SLP 220 and/or at least one facet on the output side 252 of optical splitter 250, at least one of the X sub-ranges $\omega_i$ in the first dimension and at least one of the Y sub-ranges $\beta_i$ in the second dimension may both correspond to the same virtual position for SLP 220 and/or the same facet on the output side of optical splitter 250. The particular virtual position for SLP 220 from which each light signal in the sweep of the total scan range Ψ in the second dimension is redirected (e.g., refracted) by optical splitter 250 may depend on (e.g., may be determined by) the particular sub-range $\beta_i$ in the second dimension to which the light signal corresponds and/or the particular faceted surface on the output side 252 of optical splitter 250 through which the light signal is refracted.

When holographic combiner 230 receives light signals corresponding to both a sweep of the total scan range Ω in the first dimension and a sweep of the total scan range Ψ in the second dimension, at least one hologram of holographic combiner 230 may converge the light signals to the N exit pupils at or proximate eye 290. In this case, the particular exit pupil towards which a light signal is converged by holographic combiner 230 may depend on (e.g., may be determined by) the particular exit pupil towards which a light signal is converged by holographic combiner 230 may depend on (e.g., may be determined by) the particular facet on the output side 252 of optical splitter 250 through or by which the light signal is refracted, which itself may depend on (e.g., may be determined by) both the particular sub-range $\omega_i$ in the first dimension and the particular sub-range $\beta_i$ in the second dimension into which the light signal is separated by optical splitter 250.

The illustrative examples of the present systems, devices, and methods depicted in FIGS. 2A, 2B, 2C, 2D, and 2E are all generally shown in two-dimensions and generally illustrate eyebox configurations in which multiple exit pupils are spatially separated in one dimension across the eye of the user. In practice, the expanded eyebox configurations described herein may comprise any number N of replicated or repeated exit pupils arranged in any two-dimensional configuration over the area of the eye of the user. An example configuration with N=4 replicated/repeated exit pupils is provided in FIG. 3.

Figure 3:
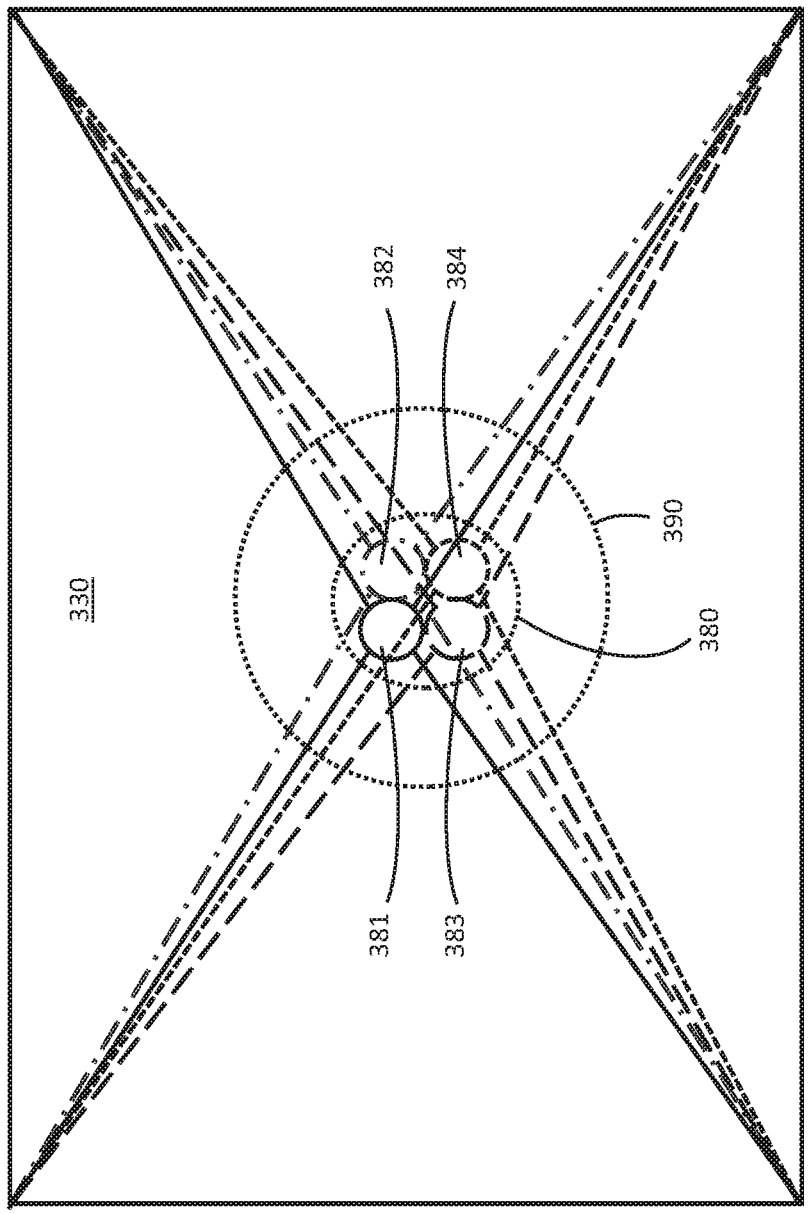
FIG. 3 is an illustrative diagram showing an exemplary holographic combiner in two-dimensions converging four instances of replicated (e.g., repeated) light signals to form an expanded eyebox comprising four spatially-separated exit pupils at or proximate the eye of a user in accordance with the present systems, devices, and methods.

FIG. 3 is an illustrative diagram showing an exemplary holographic combiner 330 in two-dimensions converging four instances of replicated (e.g., repeated) light signals to form an expanded eyebox 380 comprising four spatially-separated exit pupils 381, 382, 383, and 384 at or proximate the eye 390 of a user in accordance with the present systems, devices, and methods. Exit pupils 381, 382, 383, and 384 are distributed over a two-dimensional area at or near eye 390 to cover a wide range of pupil positions (e.g., gaze directions) for eye 390. As long as the pupil of eye 390 is positioned within eyebox 380, at least one of exit pupils 381, 382, 383, and 384 (in some cases a combination of at least two of exit pupils 381, 382, 383, and 384) will provide light signals through the pupil to eye 390 and the user will be able to see the projected image. In terms of optical path, each one of exit pupils 381, 382, 383, and 384 may receive light signals corresponding to a respective sub-range $\varphi_i$ of the total scan range θ of an SLP.

Exemplary optical splitter 250 in FIGS. 2A, 2B, 2C, 2D, and 2E includes a faceted, prismatic, polygonal structure. The particular geometry and number of facets in the structure of optical splitter 250 is shown for illustrative purposes only and not intended to limit the composition of the optical splitters described herein to any number N or engineered arrangement of faceted surfaces. A non-limiting example of a particular construction and operation for an optical splitter is provided in FIGS. 4A-4C and FIG. 5.

Figure 4:
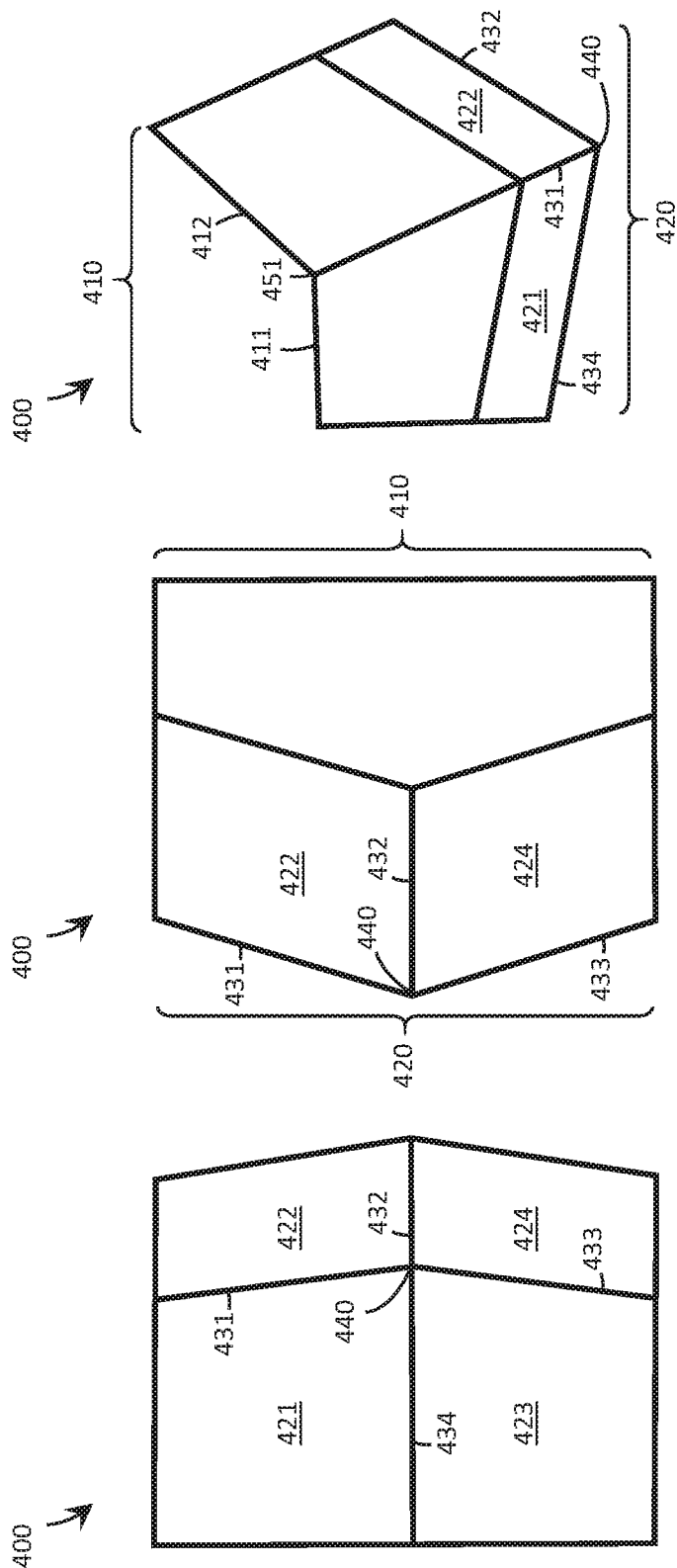
FIGS. 4A, 4B and 4C are respectively front elevation, side elevation and top plan views of a transparent polygonal structure that may be used in an optical splitter in accordance with the present systems, devices, and methods.

FIGS. 4A-4C show three views of a transparent polygonal structure 400 that may be used in an optical splitter in accordance with the present systems, devices, and methods. The three views depicted include in FIG. 4A a front view of polygonal structure 400, in FIG. 4B a side view of polygonal structure 400, and in FIG. 4C a top view of polygonal structure 400. Various elements may or may not be visible in each of the three views and the following description of polygonal structure 400 makes reference to FIGS. 4A-4C in general without specifying the specific view or views in which any given element may or may not be visible and/or called out.

Polygonal structure 400 includes an input side 410 that, in use, is oriented to receive light from a light source and in-couple the light into the inner volume of polygonal structure 400. At the other end, generally opposing input side 410, polygonal structure 400 further includes a faceted output side 420. In the illustrated example, output side 420 includes four facets 421, 422, 423, and 424 arranged in a two-by-two array with two rows of facets (the first row comprising facets 421 and 422 and the second row comprising facets 423 and 424) and two columns of facets (the first column comprising facets 421 and 423 and the second column comprising facets 422 and 424); however, in alternative implementations polygonal structure 400 may comprise any number N (where N is an integer greater than 1) of facets on output side 420 arranged in any configuration other than an array or in an array having any number of rows, any number of columns, and any number of facets per row and/or per column.

Each of the four facets 421, 422, 423, and 424 on output side 420 comprises a respective substantially rectangular surface (i.e., substantially rectangular in the plane of the facet itself, though appearing skewed in the two-dimensional views of FIGS. 4A-4C). The term "rectangular" is used loosely herein with reference to the planar surfaces of facets and, unless the specific context requires otherwise, should generally be construed as "substantially rectangular," meaning a four-sided polygon having internal angles each within the range of 90°±10°. The respective rectangular surface of each respective one of facets 421, 422, 423, and 424 shares a first edge with a first other one of facets 421, 422, 423, and 424 and a second edge with a second other one of facets 421, 422, 423, and 424. Specifically, first facet 421 shares a first edge 431 with second facet 422 and a second edge 434 with third facet 423, second facet 422 shares a first edge 431 with first facet 421 and a second edge 432 with fourth facet 424, third facet 423 shares a first edge 434 with first facet 421 and a second edge 433 with fourth facet 424, and fourth facet 424 shares a first edge 432 with second facet 424 and a second edge 433 with third facet 423. The respective rectangular surface of each one of facets 421, 422, 423, and 424 is oriented at a different respective angle in three-dimensional space relative to the respective rectangular surfaces of the other ones of facets 421, 422, 423, and 424, although generally the respective rectangular surface of each one of facets 421, 422, 423, and 424 is oriented to at least partially face away from the respective rectangular surfaces of each of the other ones of facets 421, 422, 423, and 424. This "edge-sharing" and "mutually facing away" configuration imparts a generally convex property to output side 420, where the term "convex" is used herein to refer to a generally "outward-protruding" surface and is not meant to imply (but does not exclude) a curvature in or on the surface. A respective first vertex of each one of facets 421, 422, 423, and 424 mates with the respective first vertices of each of the other ones of facets 421, 422, 423, and 424 to form a vertex 440 on the convex outer surface of output side 420 of polygonal structure 400.

As described in detail with reference to FIGS. 2A, 2B, 2C, 2D, and 2E, the number, geometries, and specific orientations of facets 421, 422, 423, and 424 relative to one another and relative to both input side 410 and output side 420, influences the splitting function performed by polygonal structure 400. Input side 410 of polygonal structure 400 is oriented to, in use, receive light from a light source and in-couple the light into the inner volume of polygonal structure 400. Generally, each of facets 421, 422, 423, and 424 is oriented to, in use, out-couple a respective portion of such light from the volume of polygonal structure 400 and direct the respective portion of the light away from polygonal structure 400 along a different respective optical path.

In some implementations, any or all of facets 421, 422, 423, and 424 may be curved or include a curved surface. In the illustrated example of polygonal structure 400, each of facets 421, 422, 423, and 424 comprises a respective planar surface that is oriented: i) at a different angle in each of at least two spatial dimensions relative to the respective planar surfaces of the other ones of facets 421, 422, 423, and 424; and ii) in a unique respective plane that intersects each of the respective planes of the other ones of facets 421, 422, 423, and 424 along a respective line of intersection. The orientations of the respective planes of facets 421, 422, 423, and 424 are such that no line of intersection between the respective planes of any pair of facets among facets 421, 422, 423, and 424 is parallel to any other line of intersection between the respective planes of any other pair of facets among facets 421, 422, 423, and 424. Shared edges 431, 432, 433, and 434 provide illustrative examples of this property. The respective planes of first facet 421 and second facet 422 intersect along a line of intersection that includes shared edge 431, the respective planes of second facet 422 and fourth facet 424 intersect along a line of intersection that includes shared edge 432, the respective planes of fourth facet 424 and third facet 423 intersect along a line of intersection that includes shared edge 433, and the respective planes of third facet 423 and second facet 422 intersect along a line of intersection that includes shared edge 434. As is apparent in the three views of FIGS. 4A-4C, no pair of shared edges 431, 432, 433, and 434 are parallel with one another. A person of skill in the art will appreciate that the line of intersection between the plane of first facet 421 and the plane of fourth facet 424 would pass through vertex 440 and appear to connect approximately between the "422" and "423" labels in the front view of polygonal structure 400 in FIG. 4A, which is not parallel to any of shared edges 431, 432, 433, and 434. Similarly, the line of intersection between the plane of second facet 422 and the plane of third facet 423 would pass through vertex 440 and appear to connect approximately between the "421" and "424" labels in the front view of polygonal structure 400 in FIG. 4A, which is also not parallel to any of shared edges 431, 432, 433, and 434 nor is it parallel to the line of intersection between the place of first facet 421, and the plane of fourth facet 424.

Input side 410 of polygonal structure 400 may also include a number M of facets, where M is an integer greater than 1. In the illustrated example, input side 410 of polygonal structure 400 includes two facets 411 and 412, each of which is oriented to, in use, in-couple a respective portion of the light from a light source into the volume of polygonal structure 400 and direct the respective portion of the light towards a respective subset of two of the four facets 421, 422, 423, and 424 on output side 420 of polygonal structure. Specifically, first facet 411 on input side 410 is oriented to direct a first portion of light from a light source towards first facet 421 and third facet 423 on output side 420 and second facet 412 on input side 410 is oriented to direct a second portion of light from the light source towards second facet 422 and fourth facet 424 on output side 420. Generally, each of the M facets on the input side (410) of a polygonal structure (400) may be oriented to direct a respective portion of the light from a light source towards a respective subset of P of the N facets (421, 422, 423, and 424) on the output side (420), where P is an integer less than or equal to N, while in the illustrated example of FIGS. 4A-4C, the number N=4 of facets 421, 422, 423, and 424 on output side 420 is greater than the number M=2 of facets 411, 412 on input side 410 and P=2, which is less than N.

First facet 411 and second facet 412 on input side 410 share an edge 451. That is, first facet 411 has a first edge 451 that mates with a first edge of second facet 412. In the illustrated example of polygonal structure 400, first facet 411 and second facet 412 on input side 410 are oriented to at least partially face one another. This "edge-sharing" and "mutually facing towards" configuration imparts a generally concave property to input side 410, where the term "concave" is used herein to refer to a generally "sunken inward" surface and is not meant to imply (but does not exclude) a curvature in or on the surface. The respective inward-facing surfaces of facet 411 and facet 412 mate along shared edge 451 to form an obtuse angle on the concave outer surface of input side 410.

Depending on the specific implementation, input side 410 may include a single surface or any number M of faceted surfaces. When M is greater than 1, each of the M facets of input side 410 may comprise a respective planar surface, and the planar surface of each one of the M facets of input side 410 may be oriented at a different angle in at least one spatial dimension relative to the other ones of the M facets of input side 410. Furthermore, the respective planar surfaces of each of the M facets of input side 410 may be oriented at different angles in at least one spatial dimension relative to each of the N facets of output side 420.

In order to perform the optical splitting function as described herein, polygonal structure 400 is: i) generally transparent to the wavelength(s) of light that are applied thereto for the purpose of optical splitting, and ii) advantageously formed of a material that has a different index of refraction than the environment or medium at the outside of input side 410 and/or output side 420. Examples of suitable materials from and/or with which polygonal structure 400 may be formed, fabricated, manufactured, or assembled include glasses, plastics, acrylics, fluorite, and optical glasses such as N—BK7 optical glass. In accordance with the present systems, devices, and methods, the relative angles of the facets 421, 422, 423, and 424 on output side 420 of polygonal structure 400, together with the relative indices of refraction of the material of which polygonal structure 400 is made (e.g., N—BK7) and the environment or medium around polygonal structure 400 (e.g., air), determine the relative trajectories of the respective light signals that out-couple from the inner volume of polygonal structure at each respective facet 421, 422, 423 and 424. With the teachings herein, a person of skill in the art will appreciate how the number, arrangement, and geometry of facets on the output side of a polygonal structure, and the material of the polygonal structure itself, may all be engineered to provide a specific optical splitting function (e.g., an engineered number of output light paths following engineered trajectories) suitable for a particular application.

In some implementations, polygonal structure 400 may be formed (e.g., machined, molded, cast, shaped, or otherwise constructed) of a single volume of material (i.e., single unitary one piece construction). In other implementation, polygonal structure 400 may be formed of two or more separate volumes of material that are bonded together (i.e., integral two piece construction). For example, polygonal structure 400 may comprise a first volume of material that includes input facet 411 and output facets 421 and 423 and a second volume of material that includes input facet 412 and output facets 422 and 424, where the first and second volumes of material are bonded together to form shared edge 451 on input side 410 and shared edges 431 and 433 on output side 420. Such bonding may include the use of an adhesive (e.g., an optical adhesive), such as a pressure-sensitive adhesive, a temperature-sensitive adhesive, or a UV-sensitive adhesive. When multiple volumes of material are bonded together to form polygonal structure 400, the multiple volumes of material may each be formed of the same material to provide a uniform index of refraction or the multiple volumes of material may be formed of at least two different materials having different indices of refraction.

One or more surfaces of polygonal structure 400 may include an optical coating, such as a polarizing layer, a diffractive layer, or the like in order to tune, adjust, filter, or remove aberrations from the light signals passing therethrough. Likewise, polygonal structure 400 may include diffractive features (i.e., on one or more surface(s) thereof or in an inner volume thereof) for beam-shaping, optical power, or correcting aberrations and/or one or more facet(s) may be formed out of a material having a different refractive index from the material of which one or more other facet(s) is/are formed.

While not limited to such an application, polygonal structure 400 is particularly well-suited for use in optical splitter 150 of WHUD 100 or as a substitute for optical splitter 250 of WHUD 200 (i.e., to provide 4 exit pupils in WHUD 200 rather than the 3 exit pupils provided by optical splitter 250). Indeed, in some applications it may be advantageous for a WHUD, such as WHUD 100 or WHUD 200, to include a modular optical splitter element so that a different splitter element (e.g., a different transparent polygonal structure) may be swapped in or out of the WHUD in order to provide a different eyebox construction depending on the requirements of a specific application.

A more detailed description of the splitting function of polygonal structure 400 in a WHUD application, such as in the role of optical splitter 150 of WHUD 100 from FIG. 1 or optical splitter 250 of WHUD 200 from FIG. 2, is now provided.

Figure 5:
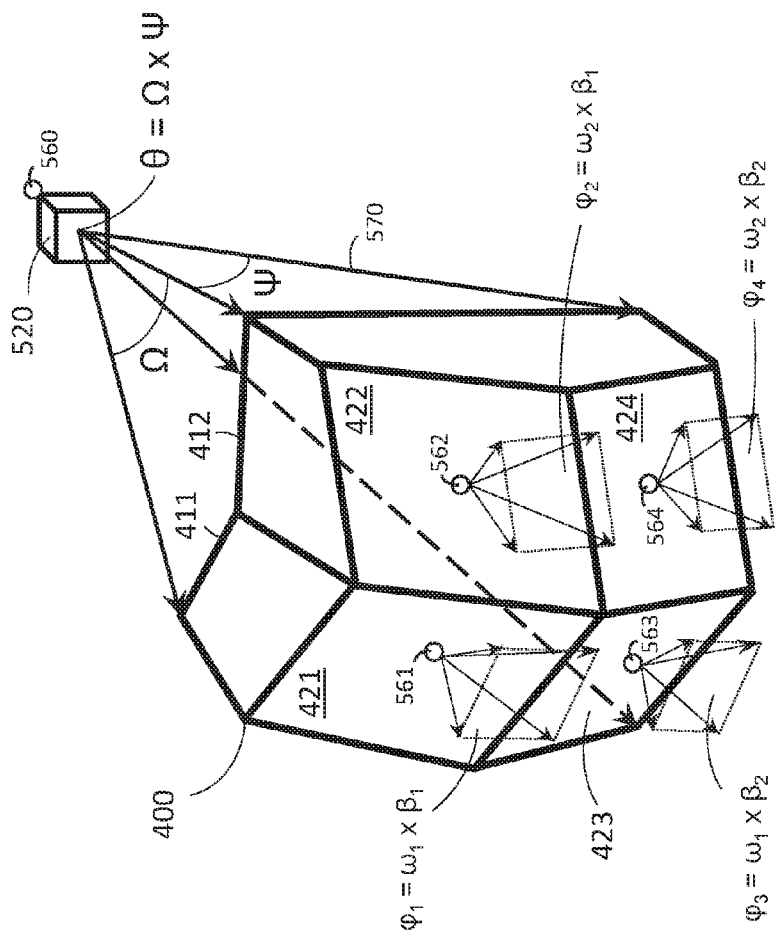
FIG. 5 is an illustrative diagram showing a perspective view of the polygonal structure from FIG. 4 in operation as a component of an optical splitter in a wearable heads-up display in accordance with the present systems, devices, and methods.

FIG. 5 is an illustrative diagram showing a perspective view of polygonal structure 400 from FIGS. 4A-4C in operation as a component of an optical splitter (e.g., optical splitter 150 from FIG. 1 or optical splitter 250 from FIGS. 2A, 2B, 2C, 2D, and 2E) in a WHUD in accordance with the present systems, devices, and methods. More specifically, FIG. 5 shows polygonal structure 400 separating the total two-dimensional scan range $\theta$ of a SLP 520 into four two-dimensional sub-ranges $\varphi_1$, $\varphi_2$, $\varphi_3$, and $\varphi_4$ in accordance with the present systems, devices, and methods. Because FIG. 5 provides another view of the same polygonal structure from FIGS. 4A-4C, references to certain elements of polygonal structure 400 are specifically identified in FIG. 5 but may be found in FIGS. 4A-4C. Any labels or reference numbers that are not included in FIG. 5 are omitted in order to reduce clutter.

The four facets 421, 422, 423, and 424 on the output side 420 (not called out in FIG. 5 to reduce clutter) of polygonal structure 400 are arranged to define distinct out-coupling or output regions each respectively corresponding to a specific sub-range $\varphi_i$ of the total scan range $\theta$ of SLP 520 and each respectively corresponding to all optical paths that trace back to a respective one of N=4 virtual positions 561, 562, 563, and 564 for SLP 520. In order to align with and deliberately redirect light signals 570 from SLP 520, the various output facets 421, 422, 423, and 424 of polygonal structure 400 are arranged at different angles relative to one another, relative to the input and output optical paths of light signals 570, and relative to any or all of the length, width, and/or depth of polygonal structure 400. Generally, at least one respective output facet 421, 422, 423, and 424 corresponds to each respective one of the N=4 spatially-separated virtual positions 561, 562, 563, and 564 for SLP 520.

FIG. 5 shows that the total two-dimensional scan range $\theta$ of SLP 520 comprises a total scan range $\Omega$ in a first (e.g., horizontal) dimension and a total scan range $\Psi$ in a second (e.g., vertical) dimension, with $\theta=\Omega\times\Psi$. SLP 520 is located at real position 560. For a sweep of the total two-dimensional scan range $\theta$ of SLP 520, polygonal structure 400 (e.g., various external and our internal surfaces and/or facets 421, 422, 423, and 424 thereof) receives light signals 570 from SLP 520 at real position 560, splits light signals 570 into four two-dimensional sub-ranges $\varphi_1$, $\varphi_2$, $\varphi_3$, and $\varphi_4$, and redirects light signals 570 so that each two-dimensional sub-range $\varphi_1$, $\varphi_2$, $\varphi_3$, and $\varphi_4$ appears to effectively originate from a respective spatially-separated virtual position 561, 562, 563, and 564 for SLP 520. Virtual positions 561, 562, 563, and 564 are spatially-separated over at least two spatial dimensions (e.g., over two or three spatial dimensions). The particular two-dimensional sub-range $\varphi_i$ into which polygonal structure 400 splits any given light signal 570 depends on (e.g., is determined by) the particular point of incidence and trajectory of that light signal at or on polygonal structure 400 and how the input and output surface angles, together with the index of refraction of polygonal structure 400, cause light signals having that particular point of incidence and trajectory to refract and route through the volume of polygonal structure 400. Thus, for a sweep of the total two-dimensional scan range θ of SLP 520, polygonal structure 400 redirects (e.g., refracts) first sub-range $\varphi_1$ of light signals 570 that are incident therein or thereon over a first range of points of incidence and that out-couple through a first output facet 421 thereof to effectively originate from first virtual position 561, polygonal structure 400 redirects (e.g., refracts) second sub-range $\varphi_2$ of light signals 570 that are incident therein or thereon over a second range of points of incidence and that out-couple through a second output facet 422 thereof to effectively originate from second virtual position 562, polygonal structure 400 redirects (e.g., refracts) third sub-range $\varphi_3$ of light signals 570 that are incident therein or thereon over a third range of points of incidence and that out-couple through a third output facet 423 thereof to effectively originate from third virtual position 563, and polygonal structure 400 redirects (e.g., refracts) fourth sub-range $\varphi_4$ of light signals 570 that are incident therein or thereon over a fourth range of points of incidence and that out-couple through a fourth output facet 424 thereof to effectively originate from fourth virtual position 564.

Because the total two-dimensional scan range θ of SLP 520 comprises a total scan range Ω in a first (e.g., horizontal) dimension and a total scan range Ψ in a second (e.g., vertical) dimension, each respective two-dimensional sub-range $\varphi_1, \varphi_2, \varphi_3,$ and $\varphi_4$ comprises a respective combination of a sub-range $\omega_i$ in the first dimension and a sub-range $\beta_i$ in the second dimension. Specifically, first two-dimensional sub-range $\varphi_1$ comprises a first sub-range $\omega_1$ in the first dimension and a first sub-range $\beta_1$ in the second dimension such that $\varphi_1 = \omega_1 \times \beta_1$, second two-dimensional sub-range $\varphi_2$ comprises a second sub-range $\omega_2$ in the first dimension and the first sub-range $\beta_1$ in the second dimension such that $\varphi_2 = \omega_2 \times \beta_1$, third two-dimensional sub-range $\varphi_3$ comprises the first sub-range $\omega_i$ in the first dimension and a second sub-range $\beta_2$ in the second dimension such that $\varphi_3 = \omega_1 \times \beta_2$, and fourth two-dimensional sub-range $\varphi_4$ comprises the second sub-range $\omega_2$ in the first dimension and the second sub-range $\beta_2$ in the second dimension such that $\varphi_4 = \omega_2 \times \beta_2$. For a rectangular or grid-like arrangement of sub-ranges $\varphi_i$, when the total two-dimensional scan range θ of SLP 520 comprises a total scan range Ω in a first dimension and a total scan range Ψ in a second dimension with θ=Ω×Ψ, the number of two-dimensional sub-ranges $\varphi_i$ may be equal to at least the number of sub-ranges w; in the first dimension multiplied by the number of sub-ranges β; in the second dimension. However, in other implementations a non-rectangular arrangement of sub-ranges $\varphi_i$, such as a triangular, circular, polygonal, or amorphous arrangement of sub-ranges $\varphi_i$, may be employed. As illustrated, each respective sub-range $\varphi_i$ corresponds to a respective output facet 421, 422, 423, and 424 of polygonal structure 400.

In some applications, output facets 421, 422, 423, and 424 may be sufficient to provide the desired splitting of laser light signals 570 from SLP 520 at real position 560 and the corresponding routing of light signals 570 from respective ones of virtual positions 561, 562, 563, and 564 for SLP 520. For example, in a WHUD application (such as WHUD 200) for which each respective one of virtual positions 561, 562, 563, and 564 maps to a respective exit pupil at the eye of the user, output facets 421, 422, 423, and 424 may be sufficient in defining such exit pupils. However, in addition to output facets 421, 422, 423, and 424, polygonal structure 400 also makes use of two input facets 411, and 412. In accordance with the present systems, devices, and methods, output facets (i.e., facets on output side 420 of polygonal structure 400) may be employed to define respective exit pupils in a scanning laser-based WHUD application while input facets (i.e., facets on input side 410 of polygonal structure 400) may be employed to further refine the relative positions of the exit pupils at the eye of the user. In particular, for a WHUD application in which the SLP (e.g., SLP 520) has a conventional, rectangular aspect ratio (such as a 4:3 aspect ratio or a 16:9 aspect ratio), output facets 421, 422, 423, and 424 may be engineered to define four exit pupils each corresponding to a respective quadrant of the rectangular aspect ratio provided by the SLP, while input facets 411 and 412 may be engineered to adjust the relative positions of the four exit pupils at the eye of the user to remove the rectangular aspect ratio from the spacing of the exit pupils themselves.

As an example, SLP 520 may be designed and operated to scan laser light 570 over an area having a 4:3 aspect ratio. Input side 410 of polygonal structure 400 may itself have a 4:3 aspect ratio in order to accommodate the 4:3 aspect ratio of the scan area from SLP 520. Each of four output facets 421, 422, 423, and 424 may have a respective 4:3 aspect ratio to split the total 4:3 aspect ratio of display content projected by SLP 520 into four quadrants (e.g., four nominally replicated quadrants as described previously) each having a 4:3 aspect ratio itself. Each one of the four output facets 421, 422, 423, and 424 may provide a respective replicated instance of display content having a 4:3 aspect ratio to a respective one of four exit pupils at the eye of the user; however, in the absence of any further measure, the exit pupils themselves may be laid out in a 4:3 aspect ratio at the eye of the user. This may mean, for example, that if the four exit pupils are routed to the eye of the user in a configuration similar to that illustrated in FIG. 3, the centroids of the two horizontally-adjacent exit pupil pairs (i.e., exit pupils 381, 382 and exit pupils 383, 384 in FIG. 3) may be separated by a dimensionless measure of "4" while the centroids of the two vertically-adjacent exit pupil pairs (i.e., exit pupils 381, 383 and exit pupils 382, 384 in FIG. 3) may be separated by a dimensionless measure of "3." In other words, the horizontal separation between exit pupil 381, 382 and exit pupils 383, 384 in FIG. 3 may be greater than the vertical separation between exit pupils 381, 383 and exit pupils 382, 384 in FIG. 3, undesirably resulting in either excessive exit pupil overlap for vertically-separated exit pupils 381, 383 and 382, 384 or excessive gaps between exit pupils for horizontally-separated exit pupils 381, 382, and 383, 384. In accordance with the present systems, devices, and methods, input facets 411 and 412 of polygonal structure 400 may be engineered to accommodate, account for, or compensate for the aspect ratio of SLP 520 in the relative positions of the exit pupils in a WHUD application and shift the horizontal or vertical spacing of the exit pupils so that the exit pupils themselves may be arranged in a 1:1 aspect ratio formation such as that illustrated in FIG. 3. In this example, the exit pupils are arranged in a 1:1 formation but each exit pupil still provides a respective instance of 4:3 display content to the eye of the user.

Throughout this specification and the appended claims, a transparent polygonal structure is often referred to or recited as a component of an optical splitter. This is to allow for the fact that the optical splitters described herein may (but are not required to) include other components in addition to a transparent polygonal structure. Examples of other components that may be included in an optical splitter in addition to a transparent polygonal structure include, without limitation, one or more optic(s) (e.g., optical structure(s)) for routing and/or orienting light signals from a light source (e.g., laser light from an SLP) to the input side of the polygonal structure and/or one or more optic(s) (e.g., optical structure(s)) for routing and/or orienting light signals (e.g., laser light) from the output side of the polygonal structure (e.g., in between the output side of the polygonal structure and a holographic combiner in a scanning laser-based WHUD application). Such additional optics may include one or more reflector(s), lens(es), periscope(s), fold mirror (s), fiber optic(s), waveguide(s), or other optical routing structures.

In accordance with the present systems, devices, and methods, the eyebox of a retina-scanning projector may be expanded by replication of one or more exit pupils. In this approach, a given exit pupil may have a defined size that is about equal to or smaller than the diameter of the eye's pupil, such as about 4 mm or less (e.g., about 2 mm), so that all light from an image enters the eye when the exit pupil impinges on (e.g., aligns with or overlies) the user's (physical) pupil. However, when the user moves their eye, alignment between the exit pupil and the user's pupil may be lost and the projected image may disappear from the user's field of view. Thus, in the "eyebox expansion through exit pupil replication" approaches described herein, multiple exit pupils may be projected and tiled over the user's eye so that at least one exit pupil aligns with the user's eye for multiple, many, most, or all eye positions.

Throughout this specification and the appended claims, the term "about" is sometimes used in relation to specific values or quantities. For example, fast-convergence within "about 2 cm." Unless the specific context requires otherwise, the term about generally means±15%.

A person of skill in the art will appreciate that the present systems, devices, and methods may be applied or otherwise incorporated into WHUD architectures that employ one or more light source(s) other than a SLP. For example, in some implementations the SLP described herein may be replaced by another light source, such as a light source comprising one or more light-emitting diodes ("LEDs"), one or more organic LEDs ("OLEDs"), one or more digital light processors ("DLPs"). Such non-laser implementations may advantageously employ additional optics to collimate, focus, and/ or otherwise direct projected light signals. Unless the specific context requires otherwise, a person of skill in the art will appreciate that references to a "SLP" throughout the present systems, devices, and methods are generic to other light sources (combined with other optics, as necessary) that may be applied or adapted for application to accomplish the same general function(s) associated with the SLPs described herein.

A person of skill in the art will appreciate that the present systems, devices, and methods may be applied or otherwise incorporated into WHUD architectures that employ one or more transparent combiner(s) other than a holographic combiner. For example, in some implementations the holographic combiner described herein may be replaced by a non-holographic device that accomplishes substantially the same general function(s), such as prismatic film, a film that carries a microlens array, and/or a waveguide structure. Such non-holographic implementations may or may not employ additional optics. Unless the specific context requires otherwise, a person of skill in the art will appreciate that references to a "holographic combiner" throughout the present systems, devices, and methods are generic to other transparent combiners (combined with other optics, as necessary) that may be applied or adapted for application to accomplish the same general function(s) associated with the holographic combiners described herein.

A person of skill in the art will appreciate that the various embodiments for eyebox expansion by exit pupil replication described herein may be applied in non-WHUD applications. For example, the present systems, devices, and methods may be applied in non-wearable heads-up displays and/or in other projection displays, including virtual reality displays, in which the holographic combiner need not necessarily be transparent.

In binocular implementations (i.e., implementations in which display content is projected into both eyes of the user), the total field of view may be increased by deliberately projecting a different field of view to each eye of the user. The two fields of view may overlap, so that both eyes see content at the center of the field of view while the left eye sees more content at the left of the field of view and the right eye sees more content at the right of the field of view.

In some implementations that employ multiple exit pupils, all exit pupils may optionally be active at all times (allowing for temporal separation). Alternatively, implementations that also employ eye-tracking, may activate only the exit pupil that corresponds to where the user is looking (based on eye-tracking) while one or more exit pupil(s) that is/are outside of the user's field of view may be deactivated.

In some implementations, the scan range of the projector can be actively changed to increase resolution in the direction the eye is looking or in the occupied exit pupil. Such is an example of heterogeneous image resolution as described in U.S. Provisional Patent Application Ser. No. 62/134,347.

Eyebox expansion may advantageously enable a user to see displayed content while gazing in a wide range of directions. Furthermore, eyebox expansion may also enable a wider variety of users having a wider range of eye arrangements to adequately see displayed content via a given WHUD. Anatomical details such as interpupillary distance, eye shape, relative eye positions, and so on can all vary from user to user. The various eyebox expansion methods described herein may be used to render a WHUD more robust over (and therefore more usable by) a wide variety of users having anatomical differences. In order to even further accommodate physical variations from user to user, the various WHUDs described herein may include one or more mechanical structure(s) that enable the user to controllably adjust the physical position and/or alignment of one or more exit pupil(s) relative to their own eye(s). Such mechanical structures may include one or more hinge(s), dial(s), flexure(s), tongue and groove or other slidably-coupled components, and the like. For example, at least one of the SLP and/or the optical splitter may be physically movable and/or rotatable on the support structure and the user may physically move and/or rotate the SLP and/or the optical splitter to change a position of at least one of the N exit pupils relative to the eye. Alternatively, the approaches taught herein may advantageously avoid the need for inclusion of such additional mechanical structures, allowing a smaller package and less weight than might otherwise be obtainable.

In some implementations, one or more optical fiber(s) may be used to guide light signals along some of the paths illustrated herein.

The various implementations described herein may, optionally, employ the systems, devices, and methods for preventing eyebox degradation described in U.S. Provisional Patent Application Ser. No. 62/288,947.

The WHUDs described herein may include one or more sensor(s) (e.g., microphone, camera, thermometer, compass, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s). The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

The various implementations of WHUDs described herein may include any or all of the technologies described in U.S. Provisional Patent Application Ser. No. 62/117,316, U.S. Provisional Patent Application Ser. No. 62/156,736, and/or U.S. Provisional Patent Application Ser. No. 62/242,844.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/147,638, U.S. Non-Provisional patent application Ser. No. 15/046,254, U.S. Provisional Patent Application Ser. No. 62/214,600, U.S. Provisional Patent Application Ser. No. 62/268,892, U.S. Provisional Patent Application Ser. No. 62/167,767, U.S. Provisional Patent Application Ser. No. 62/271,135, U.S. Provisional Patent Application Ser. No. 62/245,792, U.S. Provisional Patent Application Ser. No. 62/281,041, U.S. Provisional Patent Application Ser. No. 62/134,347, U.S. Provisional Patent Application Ser. No. 62/288,947, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, U.S. Provisional Patent Application Ser. No. 62/117,316, U.S. Provisional Patent Application Ser. No. 62/156,736, and U.S. Provisional Patent Application Ser. No. 62/242,844, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display ("WHUD") comprising:
    a support structure that in use is worn on a head of a user;
    a scanning laser projector carried by the support structure;
    a holographic combiner carried by the support structure, wherein the holographic combiner is positioned within a field of view of an eye of the user when the support structure is worn on the head of the user; and
    an optical splitter carried by the support structure and positioned in an optical path between the scanning laser projector and the holographic combiner, wherein the optical splitter includes a transparent polygonal structure that comprises:
    an input side having at least M=2 facets, each of the M=2 facets oriented to receive laser light from the scanning laser projector and in-couple a respective portion of the laser light into a volume of the optical splitter, wherein a first edge of a first one of the at least M=2 facets mates with a first edge of a second one of the at least M=2 facets and the first facet and the second facet are oriented to at least partially face one another and form an obtuse angle on a concave outer surface of the input side of the optical splitter; and
    an output side having at least N facets, where N is an integer greater than 1, each of the N facets oriented to out-couple a respective portion of the laser light from the volume of the optical splitter and direct the respective portion of the laser light along a respective optical path towards the holographic combiner, wherein each of the at least M=2 facets on the input side of the optical splitter is oriented to direct the respective portion of the laser light towards a respective subset of P of the N facets on the output side of the optical splitter, where P is an integer less than N, and wherein the holographic combiner comprises at least one hologram positioned and oriented to receive the respective portions of the laser light from the N facets of the optical splitter and redirect each respective portion of the laser light towards a respective exit pupil at the eye of the user.

2. The WHUD of claim 1 wherein the N facets of the output side of the optical splitter are oriented to direct portions of the laser light from the scanning laser projector along respective optical paths towards the holographic combiner effectively each from a respective spatially-separated virtual position for the scanning laser projector.

3. The WHUD of claim 1 wherein the N facets of the output side of the optical splitter include at least four facets arranged in an array with at least two rows of facets and at least two columns of facets, and wherein each one of the N facets of the output side of the optical splitter shares a first edge with a first other one of the N facets of the output side of the optical splitter and a second edge with a second other one of the N facets of the output side of the optical splitter.

4. The WHUD of claim 3 wherein the output side of the optical splitter includes N=4 facets arranged in a two-by-two array, each one of the N=4 facets comprising a respective rectangular surface oriented at a different angle in three-dimensional space relative to the other ones of the N=4 facets, wherein each one of the N=4 facets is oriented to at least partially face away from each of the other ones of the N=4 facets and a respective first vertex of each one of the N=4 facets mates with the respective first vertices of each of the other ones of the N=4 facets to form a vertex on a convex outer surface of the output side of the optical splitter.

5. The WHUD of claim 1 wherein each of the N facets of the output side of the optical splitter comprises a respective planar surface, and wherein the planar surface of each one of the N facets of the output side of the optical splitter is oriented at a different angle in each of at least two spatial dimensions relative to the other ones of the N facets of the output side of the optical splitter.

6. The WHUD of claim 5 wherein the planar surface of each one of the N facets of the output side of the optical splitter is oriented in a respective plane that intersects each of the respective planes of the other ones of the N facets along a respective line of intersection, and wherein no line of intersection between the respective planes of any pair of facets among the N facets is parallel to any other line of intersection between the respective planes of any other pair of facets among the N facets.

7. The WHUD of claim 1 wherein each of the M facets of the input side of the optical splitter comprises a respective planar surface, and wherein the planar surface of each one of the M facets of the input side of the optical splitter is oriented at a different angle in at least one spatial dimension relative to the other ones of the M facets of the input side of the optical splitter and relative to each of the N facets of the output side of the optical splitter.

8. The WHUD of claim 1 wherein the optical splitter comprises multiple separate pieces that are bonded together.

9. An optical splitter including a transparent polygonal structure that comprises:
    an input side having at least M=2 facets, each of the M=2 facets oriented to receive light from a light source and in-couple a respective portion of the light into a volume of the optical splitter, wherein a first edge of a first one of the at least M=2 facets mates with a first edge of a second one of the at least M=2 facets and the first facet and the second facet are oriented to at least partially face one another and form an obtuse angle on a concave outer surface of the input side of the optical splitter; and
    an output side having at least N facets, where N is an integer greater than 1, each of the N facets oriented to out-couple a respective portion of the light from the volume of the optical splitter and direct the respective portion of the light away from the optical splitter along a different respective optical path, wherein each of the at least M=2 facets on the input side of the optical splitter is oriented to direct the respective portion of the laser light towards a respective subset of P of the N facets on the output side of the optical splitter, where P is an integer less than N, wherein each of the N facets comprises a respective planar surface that is oriented:

at a different angle in each of at least two spatial dimensions relative to the respective planar surfaces of the other ones of the N facets; and in a respective plane that intersects each of the respective planes of the other ones of the N facets along a respective line of intersection, wherein no line of intersection between the respective planes of any pair of facets among the N facets is parallel to any other line of intersection between the respective planes of any other pair of facets among the N facets.

10. The optical splitter of claim 9 wherein the N facets of the output side include at least four facets arranged in an array with at least two rows of facets and at least two columns of facets, and wherein each one of the N facets shares a first edge with a first other one of the N facets and a second edge with a second other one of the N facets.

11. The optical splitter of claim 10 wherein the output side includes N=4 facets arranged in a two-by-two array, each one of the N=4 facets comprising a respective rectangular surface oriented at a different angle in three-dimensional space relative to the other ones of the N=4 facets, wherein each one of the N=4 facets is oriented to at least partially face away from each of the other ones of the N=4 facets and a respective first vertex of each one of the N=4 facets mates with the respective first vertices of each of the other ones of the N=4 facets to form a vertex on a convex outer surface of the output side.

12. The optical splitter of claim 9 wherein each of the M facets of the input side comprises a respective planar surface, and wherein the planar surface of each one of the M facets of the input side is oriented at a different angle in at least one spatial dimension relative to the other ones of the M facets of the input side and relative to each of the N facets of the output side.

13. The optical splitter of claim 9 wherein the transparent polygonal structure comprises multiple separate pieces that are bonded together.

* * * * *